US 11,515,093 B2

(12) United States Patent
Kojima

(10) Patent No.: US 11,515,093 B2
(45) Date of Patent: Nov. 29, 2022

(54) MULTILAYER CERAMIC CAPACITOR AND MOUNTING STRUCTURE OF THE MULTILAYER CERAMIC CAPACITOR

(71) Applicant: Murata Manufacturing Co., Ltd., Nagaokakyo (JP)

(72) Inventor: Takahiro Kojima, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 44 days.

(21) Appl. No.: 17/237,085

(22) Filed: Apr. 22, 2021

(65) Prior Publication Data
US 2021/0343478 A1 Nov. 4, 2021

(30) Foreign Application Priority Data

Apr. 30, 2020 (JP) .............................. JP2020-080514

(51) Int. Cl.
*H01G 4/232* (2006.01)
*H01R 12/57* (2011.01)
*H01R 4/04* (2006.01)

(52) U.S. Cl.
CPC .......... *H01G 4/232* (2013.01); *H01G 4/2325* (2013.01); *H01R 12/57* (2013.01); *H01R 4/04* (2013.01)

(58) Field of Classification Search
CPC ...... H01G 4/232; H01G 4/2325; H01R 12/57; H01R 4/04
See application file for complete search history.

(56) References Cited

U.S. PATENT DOCUMENTS

| 2011/0102971 A1* | 5/2011 | Itamura | H01G 4/30 361/321.2 |
|---|---|---|---|
| 2015/0380164 A1 | 12/2015 | Kodama et al. | |
| 2016/0212850 A1* | 7/2016 | Kainuma | H01F 17/0013 |
| 2018/0182550 A1* | 6/2018 | Sasaki | H01G 4/232 |
| 2020/0075255 A1* | 3/2020 | Park | H01G 4/1227 |

FOREIGN PATENT DOCUMENTS

| JP | 2016-012689 A | 1/2016 | |
| JP | 2016-136614 A | 7/2016 | |
| WO | WO-2016133090 A1 * | 8/2016 | ............. H01G 4/228 |

\* cited by examiner

*Primary Examiner* — David M Sinclair
*Assistant Examiner* — Daniel M Dubuisson
(74) *Attorney, Agent, or Firm* — Keating & Bennett, LLP

(57) ABSTRACT

A multilayer ceramic capacitor includes a multilayer body including stacked dielectric layers and stacked internal electrode layers, and external electrodes respectively connected to the internal electrode layers. The external electrodes each include a lower plated layer and a Pd-plated layer on the lower plated layer. Recesses are provided on a surface of the Pd-plated layer and include first recesses each having a circle equivalent diameter of an opening of about 0.5 μm or more and about 4 μm or less and second recesses each having a circle equivalent diameter of an opening of about 10 μm or more and about 22 μm or less. The first recesses are greater in number than the second recesses. The second recesses and the first recesses are in a mixed state.

17 Claims, 12 Drawing Sheets

MULTILAYER CERAMIC CAPACITOR AND MOUNTING STRUCTURE OF THE MULTILAYER CERAMIC CAPACITOR

CROSS REFERENCE TO RELATED APPLICATIONS

This application claims the benefit of priority to Japanese Patent Application No. 2020-080514 filed on Apr. 30, 2020. The entire contents of this application are hereby incorporated herein by reference.

BACKGROUND OF THE INVENTION

1. Field of the Invention

The present invention relates to a multilayer ceramic capacitor and a mounting structure of the multilayer ceramic capacitor.

2. Description of the Related Art

Conventionally, a multilayer ceramic capacitor has been known which is mounted to a mounting substrate using a conductive adhesive. As such a multilayer ceramic capacitor, for example, Japanese Unexamined Patent Application, Publication No. 2016-12689 discloses a multilayer ceramic capacitor including external electrodes, each including a Ni-plated layer having a thickness of 3 μm to 8 μm and a Pd-plated layer having a thickness of 0.025 μm to 1 μm.

According to the multilayer ceramic capacitor of Japanese Unexamined Patent Application, Publication No. 2016-12689, it is possible to suitably mount the multilayer ceramic capacitor using a conductive adhesive. Here, the inventor of preferred embodiments of the present invention has discovered that it is preferable to configure the surfaces of the external electrodes in an appropriate manner in order to further improve the fixing force between the external electrodes of the multilayer ceramic capacitor and the conductive adhesive through the series of studies, experiments, and simulations.

SUMMARY OF THE INVENTION

Preferred embodiments of the present invention provide multilayer ceramic capacitors each capable of obtaining a high fixing strength between external electrodes and a conductive adhesive.

A multilayer ceramic capacitor according to a preferred embodiment of the present invention includes a multilayer body including a plurality of stacked dielectric layers and a plurality of stacked internal electrode layers; and external electrodes respectively connected to the internal electrode layers, in which the external electrodes each include a lower plated layer and a Pd-plated layer provided on the lower plated layer, in which a plurality of recesses are provided on a surface of the Pd-plated layer, the plurality of recesses include first recesses each having a circle equivalent diameter of an opening of about 0.5 μm or more and about 4 μm or less and second recesses each having a circle equivalent diameter of an opening of about 10 μm or more and about 22 μm or less, the first recesses are greater in number than the second recesses, and the second recesses and the first recesses are provided in a mixed state.

According to preferred embodiments of the present invention, it is possible to provide multilayer ceramic capacitors that are each capable of obtaining a high fixing strength between the external electrodes and the conductive adhesive.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings.

Figure 1:
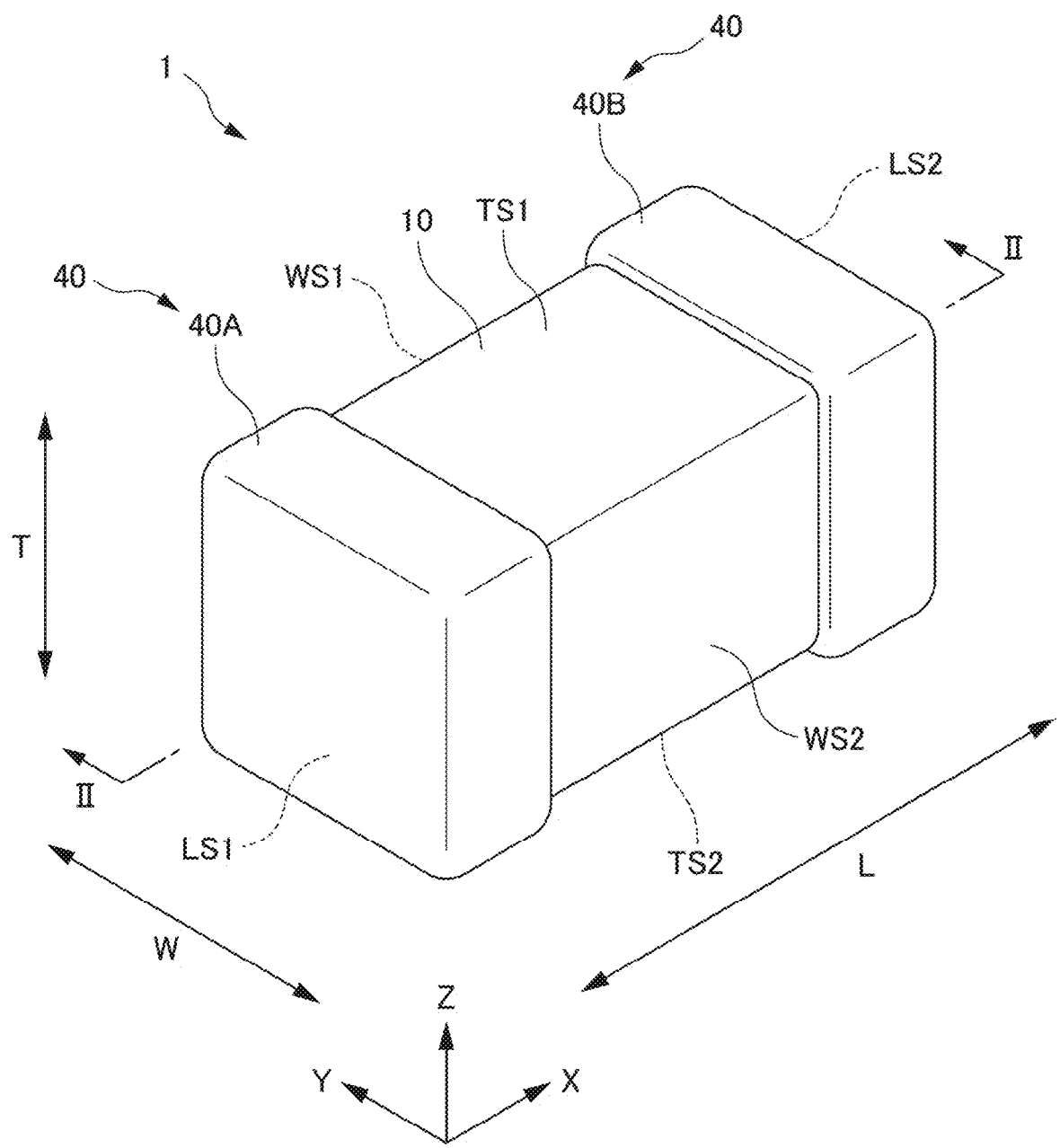
FIG. 1 is an external perspective view of a multilayer ceramic capacitor of a preferred embodiment of the present invention.
Figure 2:
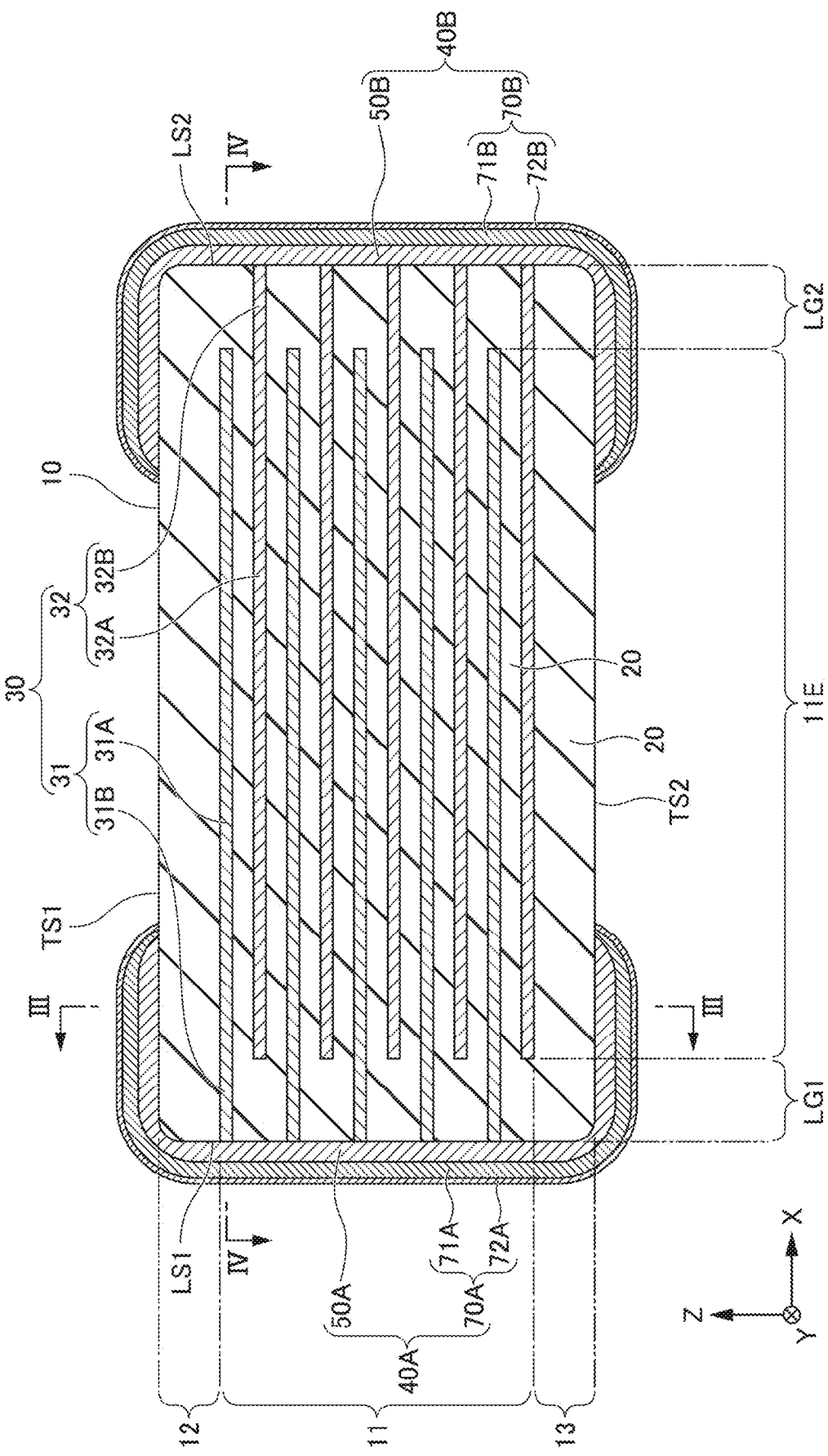
FIG. 2 is a cross-sectional view taken along the line II-II of the multilayer ceramic capacitor shown in FIG. 1.
Figure 3:
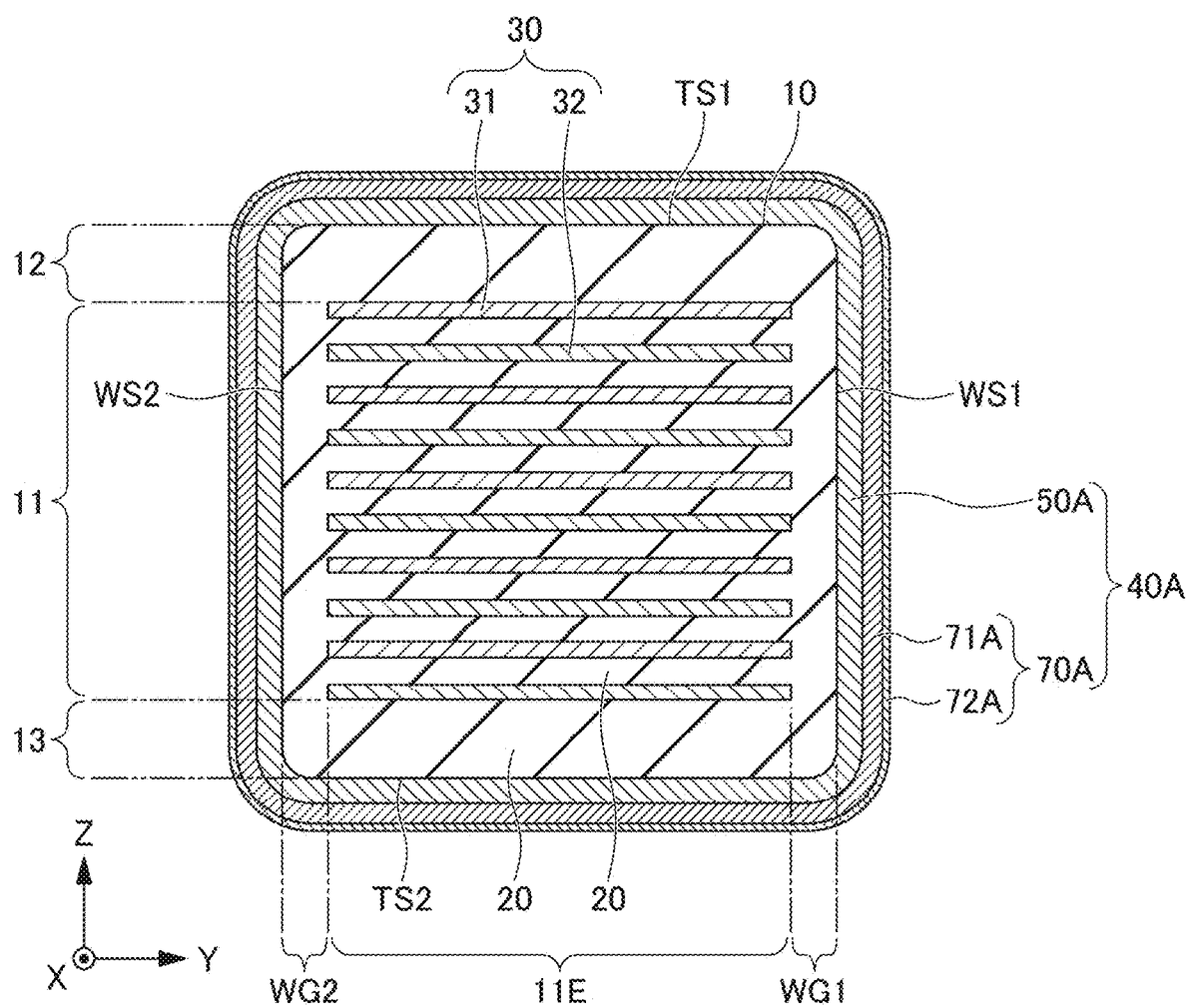
FIG. 3 is a cross-sectional view taken along the line III-III of the multilayer ceramic capacitor shown in FIG. 2.
Figure 4:
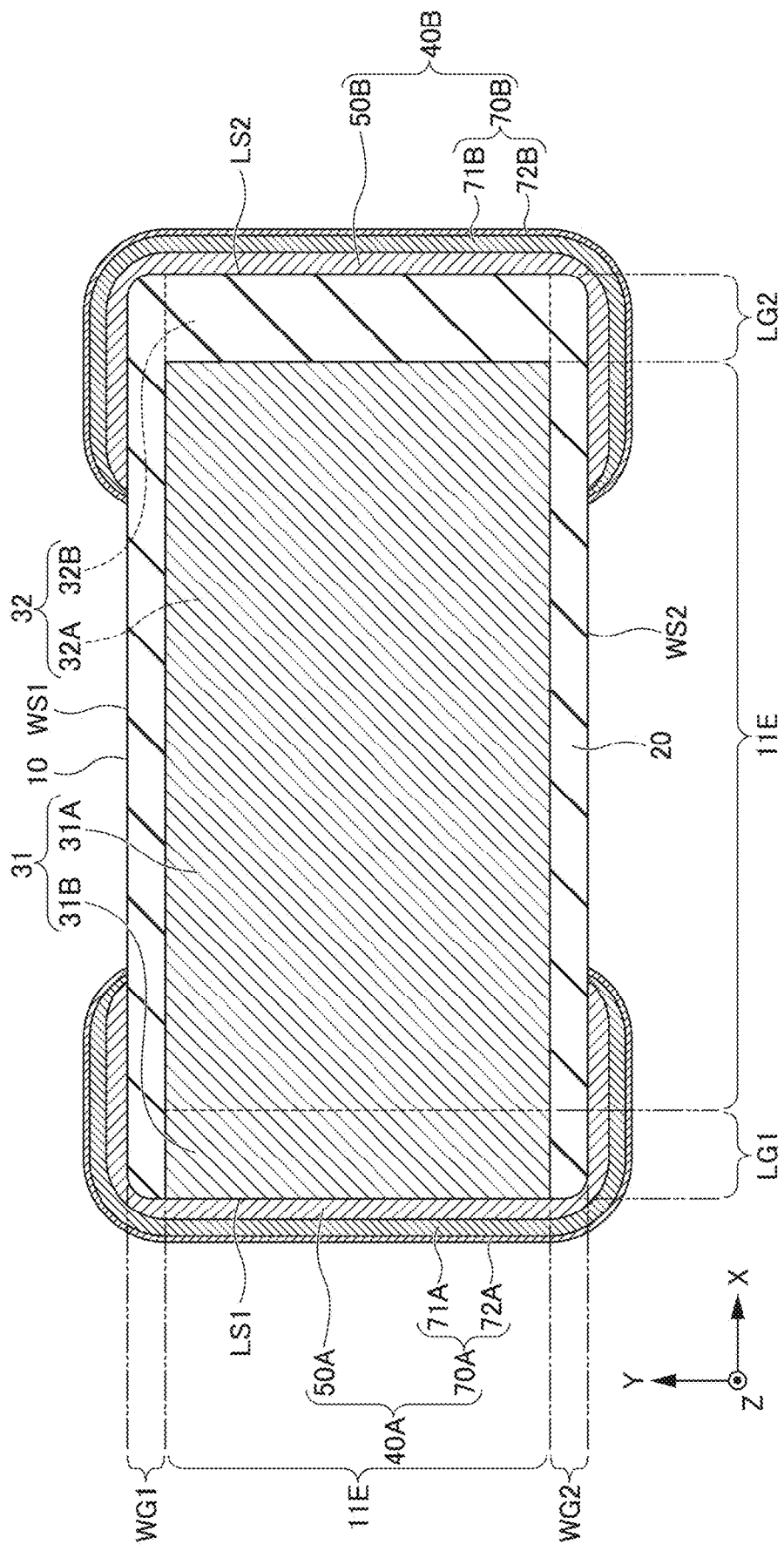
FIG. 4 is a cross-sectional view taken along the line IV-IV of the multilayer ceramic capacitor shown in FIG. 2.

Hereinafter, a multilayer ceramic capacitor 1 according to a preferred embodiment of the present invention will be described. FIG. 1 is an external perspective view of the multilayer ceramic capacitor 1 of the present preferred embodiment. FIG. 2 is a cross-sectional view taken along the line II-II of the multilayer ceramic capacitor 1 shown in FIG. 1. FIG. 3 is a cross-sectional view taken along the line III-III of the multilayer ceramic capacitor 1 shown in FIG. 2. FIG. 4 is a cross-sectional view taken along the line IV-IV of the multilayer ceramic capacitor 1 shown in FIG. 2.

The multilayer ceramic capacitor 1 includes a multilayer body 10 and external electrodes 40.

In FIGS. 1 to 4, an XYZ Cartesian coordinate system is shown. The length direction L of the multilayer ceramic capacitor 1 and the multilayer body 10 corresponds to the X direction. The width direction W of the multilayer ceramic capacitor 1 and the multilayer body 10 corresponds to the Y direction. The stacking (lamination) direction T of the multilayer ceramic capacitor 1 and the multilayer body 10 corresponds to the Z direction. The cross section shown in FIG. 2 is also referred to as LT cross section. The cross section shown in FIG. 3 is also referred to as WT cross section. The cross section shown in FIG. 4 is also referred to as LW cross section.

As shown in FIGS. 1 to 4, the multilayer body 10 includes a first main surface TS1 and a second main surface TS2 which are opposite to each other in the stacking direction T, a first side surface WS1 and a second side surface WS2 which are opposite to each other in the width direction W orthogonal or substantially orthogonal to the stacking direction T, and a first end surface LS1 and a second end surface LS2 which are opposite to each other in the length direction L orthogonal or substantially orthogonal to the stacking direction T and the width direction W.

As shown in FIG. 1, the multilayer body 10 has a rectangular or substantially rectangular shape. It should be noted that the dimension of the multilayer body 10 in the length direction L is not necessarily longer than the dimension of the width direction W. The corners and ridges of the multilayer body 10 are preferably rounded. The corner is a portion where three surfaces of the multilayer body intersect, the ridge is a portion where two surfaces of the multilayer body intersect. It should be noted that unevenness or the like may be provided on a portion or the entire surface of the multilayer body 10.

The dimensions of the multilayer body 10 are not particularly limited.

As shown in FIGS. 2 and 3, the multilayer body 10 includes an inner layer portion 11, and a first main surface-side outer layer portion 12 and a second main surface-side outer layer portion 13 which sandwich the inner layer portion 11 in the stacking direction T.

The inner layer portion 11 includes a plurality of dielectric layers 20 and a plurality of internal electrode layers 30. The inner layer portion 11 includes, in the stacking direction T, the internal electrode layer 30 closest to the first main surface TS1 to the internal electrode layer 30 closest to the second main surface TS2. In the inner layer portion 11, the plurality of internal electrode layers 30 are disposed opposite to each other with the dielectric layer 20 interposed therebetween. The inner layer portion 11 generates a capacitance and defines and functions as a capacitor.

The plurality of dielectric layers 20 are made of a dielectric material. The dielectric material may preferably be, for example, a dielectric ceramic including components such as $BaTiO_3$, $CaTiO_3$, $SrTiO_3$, or $CaZrO_3$. Furthermore, the dielectric material may include a secondary component such as, for example, a Mn compound, an Fe compound, a Cr compound, a Co compound, or a Ni compound in addition to the main component.

The thickness of the dielectric layer 20 is preferably about 0.5 μm or more and about 10 μm or less, for example. The number of the dielectric layers 20 to be stacked is preferably fifteen or more and 700 or less, for example. It should be noted that the number of the dielectric layers 20 refers to the total number of dielectric layers in the inner layer portion 11, and dielectric layers in the first main surface-side outer layer portion 12 and the second main surface-side outer layer portion 13.

The plurality of internal electrode layers 30 includes a plurality of first internal electrode layers 31 and a plurality of second internal electrode layers 32. The plurality of first internal electrode layers 31 and the plurality of second internal electrode layers 32 are alternately arranged in the stacking direction T of the multilayer body 10.

The first internal electrode layer 31 includes a first opposing portion 31A facing the second internal electrode layer 32, and a first lead-out portion 31B extending from the first opposing portion 31A to the first end surface LS1. The first lead-out portion 31B is exposed to the first end surface LS1.

The second internal electrode layer 32 includes a second opposing portion 32A facing the first internal electrode layer 31, and a second lead-out portion 32B extending from the second opposing portion 32A to the second end surface LS2. The second lead-out portion 32B is exposed to the second end surface LS2.

In the present preferred embodiment, the first opposing portion 31A and the second opposing portion 32A are opposed to each other with the dielectric layers 20 interposed therebetween, such that a capacitance is generated, and the characteristics of a capacitor are provided.

The shapes of the first opposing portion 31A and the second opposing portion 32A are not particularly limited, but are preferably rectangular or substantially rectangular, for example. However, corners of the rectangular or substantially rectangular shape may be rounded, or the corners of the rectangular or substantially rectangular shape may be oblique. The shapes of the first lead-out portion 31B and the second lead-out portion 32B are not particularly limited, but are preferably rectangular or substantially rectangular. However, the corners of the rectangular or substantially rectangular shape may be rounded, or the corners of the rectangular or substantially rectangular shape may be oblique.

The dimension in the width direction W of the first opposing portion 31A and the dimension in the width direction W of the first lead-out portion 31B may be the same or substantially the same, or one of them may have a smaller dimension. The dimension in the width direction W of the second opposing portion 32A and the dimension in the width direction W of the second lead-out portion 32B may be the same or substantially the same, or one of them may have a smaller dimension.

The first internal electrode layer 31 and the second internal electrode layer 32 are each made of a metal such as, for example, as Ni, Cu, Ag, Pd, or Au, or a suitable conductive material such as, for example, an alloy including at least one of these metals. In a case in which an alloy is used, the first internal electrode layer 31 and the second internal electrode layer 32 may preferably be made of, for example, Ag—Pd alloy.

The thickness of each of the first internal electrode layer 31 and the second internal electrode layer 32 is preferably, for example, about 0.2 μm or more, and about 2.0 μm or less. The total number of the first internal electrode layers 31 and the second internal electrode layers 32 is preferably fifteen or more and 200 or less, for example.

The first main surface-side outer layer portion 12 is located adjacent to the first main surface TS1 of the multilayer body 10. The first main surface-side outer layer portion 12 includes a plurality of dielectric layers 20 located between the first main surface TS1 and the internal electrode layer 30 closest to the first main surface TS1. The dielectric layer 20 used in the first main surface-side outer layer portion 12 may be the same or substantially the same as the dielectric layer 20 used in the inner layer portion 11.

The second main surface-side outer layer portion 13 is located adjacent to the second main surface TS2 of the multilayer body 10. The second main surface-side outer layer portion 13 includes a plurality of dielectric layers 20 located between the second main surface TS2 and the internal electrode layer 30 closest to the second main surface TS2. The dielectric layer 20 used in the second main surface-side outer layer portion 13 may be the same or substantially the same as the dielectric layer 20 used in the inner layer portion 11.

It should be noted that the multilayer body 10 includes a counter electrode portion 11E. The counter electrode portion 11E is a portion where the first opposing portion 31A of the first internal electrode layer 31 and the second opposing portion 32A of the second internal electrode layer 32 are opposite to each other. The counter electrode portion 11E is provided in a portion of the inner layer portion 11. FIG. 4 shows the range of the counter electrode portion 11E in the width direction W and in the length direction L. It should be noted that the counter electrode portion 11E is also referred to as a capacitor effective portion.

It should be noted that the multilayer body 10 includes a side surface-side outer layer portion WG. The side surface-side outer layer portion WG includes a first side surface-side outer layer portion WG1 and a second side surface-side outer layer portion WG2. The first side surface-side outer layer portion WG1 includes a dielectric layer 20 located between the counter electrode portion 11E and the first side surface WS1. The second side surface-side outer layer portion WG2 includes a dielectric layer 20 located between the counter electrode portion 11E and the second side surface WS2. FIGS. 3 and 4 each show the ranges of the first side surface-side outer layer portion WG1 and the second side surface-side outer layer portion WG2 in the width direction W. It should be noted that the side surface-side outer layer portion WG is also referred to as a W gap or a side gap.

Furthermore, the multilayer body 10 includes an end surface-side outer layer portion LG. The end surface-side outer layer portion LG includes a first end surface-side outer layer portion LG1 and a second end surface-side outer layer portion LG2. The first end surface-side outer layer portion LG1 includes a dielectric layer 20 located between the counter electrode portion 11E and the first end surface LS1. The second end surface-side outer layer portion LG2 includes a dielectric layer 20 located between the counter electrode portion 11E and the second end surface LS2. FIGS. 2 and 4 each show the ranges of the first end surface-side outer layer portion LG1 and the second end surface-side outer layer portion LG2 in the longitudinal directions L. It should be noted that the end surface-side outer layer portion LG is also referred to as L gap or end gap.

The external electrodes 40 each include a first external electrode 40A at the first end surface LS1, and a second external electrode 40B at the second end surface LS2.

The first external electrode 40A is disposed on the first end surface LS1. The first external electrode 40A is connected to the first internal electrode layer 31. The first external electrodes 40A may be disposed on a portion of the first main surface TS1 and a portion of the second main surface TS2, and also on a portion of the first side surface WS1 and a portion of the second side surface WS2. In the present preferred embodiment, the first external electrode 40A extends from the first end surface LS1 to a portion of the first main surface TS1, a portion of the second main surface TS2, a portion of the first side surface WS1, and a portion of the second side surface WS2.

The second external electrode 40B is disposed on the second end surface LS2. The second external electrode 40B is connected to the second internal electrode layer 32. The second external electrodes 40B may be disposed on a portion of the first main surface TS1 and a portion of the second main surface TS2, and also on a portion of the first side surface WS1 and a portion of the second side surface WS2. In the present preferred embodiment, the second external electrode 40B extends from the second end surface LS2 to a portion of the first main surface TS1, a portion of the second main surface TS2, a portion of the first side surface WS1, and a portion of the second side surface WS2.

As described above, in the multilayer body 10, the capacitance is provided by the first opposing portion 31A of the first internal electrode layer 31 and the second opposing portion 32A of the second internal electrode layer 32 opposing each other with the dielectric layer 20 interposed therebetween. Therefore, characteristics of the capacitor are provided between the first external electrode 40A to which the first internal electrode layer 31 is connected and the second external electrode 40B to which the second internal electrode layer 32 is connected.

Figure 5:
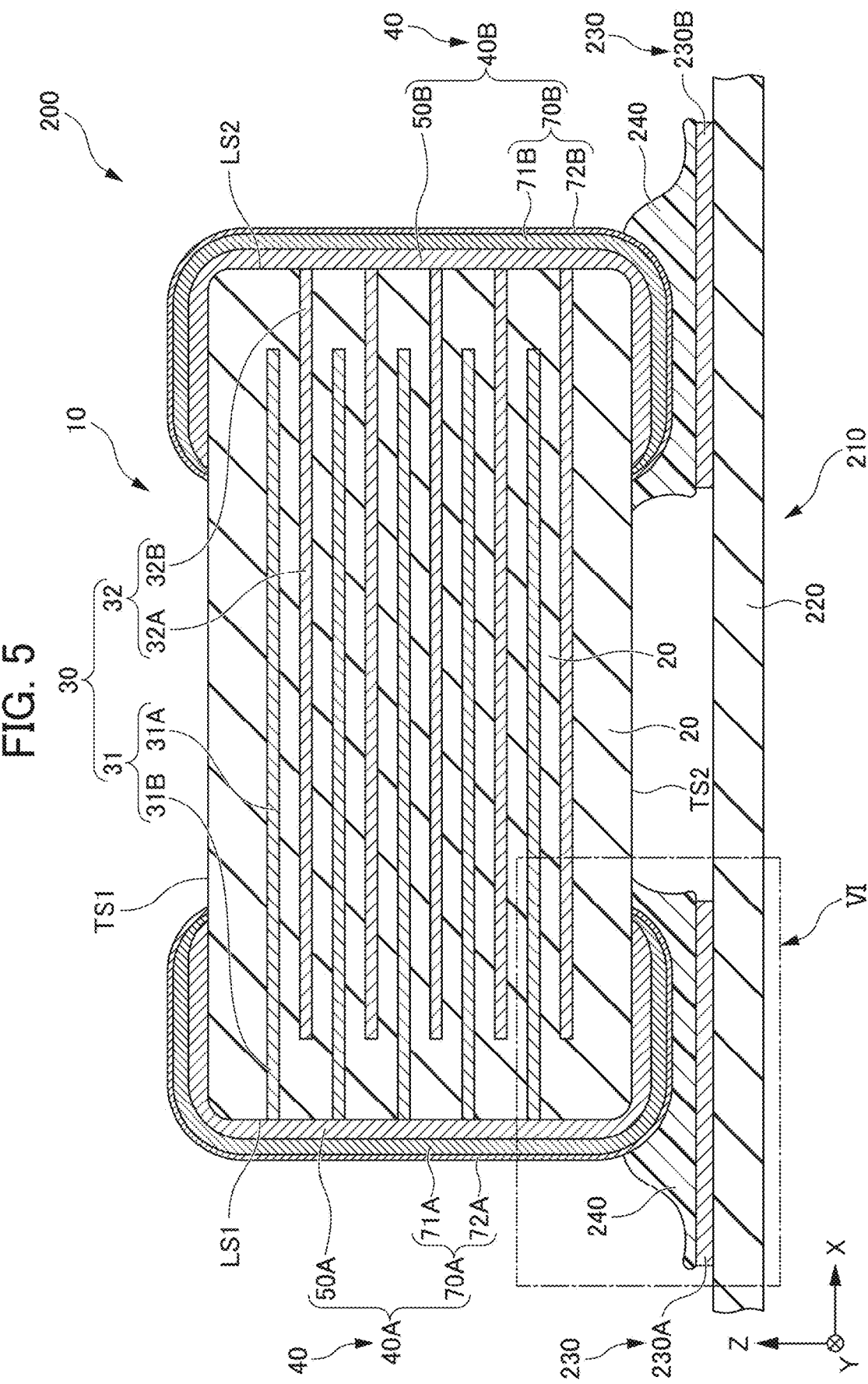
FIG. 5 is a cross-sectional view showing a mounting structure of a multilayer ceramic capacitor according to a preferred embodiment of the present invention.

FIG. 5 is a cross-sectional view showing a mounting structure 200 of the multilayer ceramic capacitor 1. A mounting substrate 210 to which the multilayer ceramic capacitor 1 is to be mounted includes a substrate body 220 and a land 230 as a connection conductor to be provided on the substrate body 220. The land 230 includes a first land 230A and a second land 230B. As shown in FIG. 5, the first external electrode 40A of the multilayer ceramic capacitor 1 is connected to the first land 230A of the mounting substrate 210 by a conductive adhesive 240. Furthermore, the second external electrode 40B of the multilayer ceramic capacitor 1 is connected to the second land 230B of the mounting substrate 210 by the conductive adhesive 240. With such a configuration, the multilayer ceramic capacitor 1 is mounted on the mounting substrate 210. It should be noted that the conductive adhesive 240 is preferably, for example, an adhesive in which a conductive filler including metal, such as Ag, is added to a thermosetting resin, such as an epoxy resin.

Figure 6:
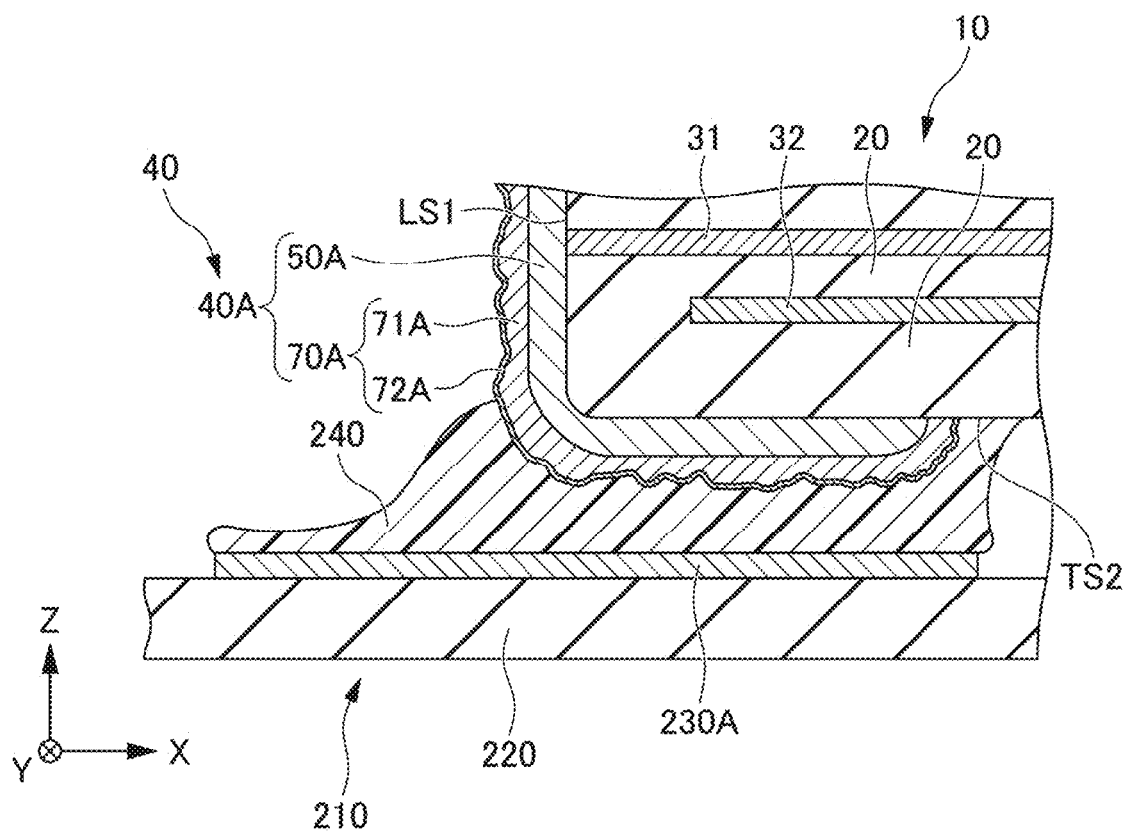
FIG. 6 is an enlarged view of a VI portion of the mounting structure shown in FIG. 5, and is a cross-sectional view schematically showing a state of the surface of the outermost layer of the external electrode of a multilayer ceramic capacitor according to a preferred embodiment of the present invention.

FIG. 6 is an enlarged view of the VI portion of the mounting structure 200 shown in FIG. 5. In FIG. 6, the state of the surface of the outermost layer of the first external electrode 40A of the multilayer ceramic capacitor 1 is shown schematically. The first external electrode 40A includes a plurality of layers to be described later. Furthermore, the outer surface of the first external electrode 40A includes recesses to improve the fixing force between the first external electrode 40A and the conductive adhesive 240. It should be noted that the configuration of the second external electrode 40B is the same as the configuration of the first external electrode 40A.

Here, the inventor of preferred embodiments of the present invention has discovered that it is preferable to configure the surfaces of the external electrodes 40 in an appropriate manner in order to improve the fixing force between the external electrodes 40 of the multilayer ceramic capacitor 1 and the conductive adhesive 240 through a series of studies, experiments, and simulations. This will be described below.

Conventionally, as an external electrode of the multilayer ceramic capacitor to mount on a mounting substrate by a conductive adhesive, it has been known to use a Ag—Pd sintered electrode of the thick film, or a Pd-plated electrode in which the outermost layer includes a Pd-plated layer, as disclosed in Japanese Unexamined Patent Application, Publication No. 2016-12689. However, in a case in which a Ag—Pd sintered electrode of the thick film is used, since the use of Pd, which is an expensive metal, is increased, it is difficult to reduce the product cost. In contrast, in a case in which a Pd-plated electrode as disclosed in Japanese Unexamined Patent Application, Publication No. 2016-12689 is used, the amount of Pd used can be reduced by thinning the Pd-plated layer. Therefore, it is possible to reduce the product cost. Furthermore, since a Pd-plated electrode has excellent heat resistance, the multilayer ceramic capacitor including a Pd-plated electrode can be mounted and used at a higher temperature.

However, in the Pd-plated electrode disclosed in Japanese Unexamined Patent Application, Publication No. 2016-12689, while thinning the Pd-plated layer, a Ni-plated layer as a lower plated layer is thickened in order to ensure a high sealing property or the like. Therefore, thickening the Ni-plated layer results in the surface of the Ni-plated layer being smooth. As a result, the surface of the Pd-plated layer which is thinly coated on the Ni-plated layer is also smooth. Here, in a case of mounting the multilayer ceramic capacitor on a mounting substrate using solder, it is better for the surface of the external electrode to be smooth in order to increase the wettability of the solder. However, in a case of mounting the multilayer ceramic capacitor on a mounting substrate using a conductive adhesive, if the surface of the external electrode is smooth, the fixing force of the conductive adhesive may be reduced. In particular, after thermal stress is applied, there is a possibility that the fixing force between the external electrode and the conductive adhesive is reduced.

In consideration of the above, the inventor of preferred embodiments of the present invention intensively studied the configuration of the external electrode capable of improving the fixing force between the external electrode and the conductive adhesive. Hereinafter, each layer of the first external electrode 40A and the second external electrode 40B of the present preferred embodiment, and the surface of the outermost layer of each of the first external electrode 40A and the second external electrode 40B will be described in detail.

The first external electrode 40A includes a first foundation electrode layer 50A and a first plated layer 70A disposed on the first foundation electrode layer 50A.

The second external electrode 40B includes a second foundation electrode layer 50B and a second plated layer 70B disposed on the second foundation electrode layer 50B.

The first foundation electrode layer 50A is disposed on the first end surface LS1. The first foundation electrode layer 50A is connected to the first internal electrode layer 31. In the present preferred embodiment, the first foundation electrode layer 50A extends from the first end surface LS1 to a portion of the first main surface TS1, a portion of the second main surface TS2, a portion of the first side surface WS1, and a portion of the second side surface WS2.

The second foundation electrode layer 50B is disposed on the second end surface LS2. The second foundation electrode layer 50B is connected to the second internal electrode layer 32. In the present preferred embodiment, the second foundation electrode layer 50B extends from the second end surface LS2 to a portion of the first main surface TS1, a portion of the second main surface TS2, a portion of the first side surface WS1, and a portion of the second side surface WS2.

In the present preferred embodiment, the first foundation electrode layer 50A and the second foundation electrode layer 50B are each a fired layer. The fired layer includes a glass component and a metal. The glass component of the fired layer preferably includes, for example, at least one selected from B, Si, Ba, Mg, Al, and Li. The metal of the fired layer metals preferably includes, for example, at least one selected from Cu, Ni, Ag, Pd, Ag—Pd alloy, and Au. The fired layer is obtained by applying a conductive paste including glass and metal to the multilayer body, and firing. The fired layer may be obtained by simultaneously firing a laminated (multilayer) chip including the internal electrode layers and the dielectric layers, and a conductive paste applied to the laminated chip, or alternatively may be obtained by firing the laminated chip including the internal electrode layers and the dielectric layers to thereby obtain a multilayer body, followed by the conductive paste being applied to the multilayer body and firing being performed. It should be noted that, in a case of simultaneously firing the laminated chip including the internal electrode layers 30 and the dielectric layers 20, and the conductive paste applied to the laminated chip, it is preferable that the fired layer is formed by firing those obtained by adding a dielectric material in place of the glass component. Furthermore, the fired layer may include a plurality of layers.

The thickness of the first foundation electrode layer 50A located on the first end surface LS1 in the length direction is preferably, for example, about 3 μm or more and about 160 μm or less at the center portion in the stacking direction T and the width direction W of the first foundation electrode layer 50A.

The thickness of the second foundation electrode layer 50B located on the second end surface LS2 in the length direction is preferably, for example, about 3 μm or more and about 160 μm or less at the center portion in the stacking direction T and the width direction W of the second foundation electrode layer 50B.

In a case in which the first foundation electrode layer 50A is provided on a portion of the first main surface TS1 and a portion of the second main surface TS2, the thickness in the stacking direction of the first foundation electrode layer 50A provided at this portion is preferably, for example, about 3 μm or more and about 40 μm or less at the center portion in the length direction L and the width direction W of the first foundation electrode layer 50A provided at this portion.

In a case in which the first foundation electrode layer 50A is provided on a portion of the first side surface WS1 and a portion of the second side surface WS2, the thickness in the width direction of the first foundation electrode layer 50A provided at this portion is preferably, for example, about 3 μm or more and about 40 μm or less at the center portion in the length direction L and the stacking direction T of the first foundation electrode layer 50A provided at this portion.

In a case in which the second foundation electrode layer 50B is provided on a portion of the first main surface TS1 and a portion of the second main surface TS2, the thickness in the stacking direction of the second foundation electrode layer 50B provided at this portion is preferably, for example, about 3 μm or more and about 40 μm or less at the center portion in the length direction L and the width direction W of the second foundation electrode layer 50B provided at this portion.

In a case in which the second foundation electrode layer 50B is provided a portion of the first side surface WS1 and a portion of the second side surface WS2, the thickness in the width direction of the second foundation electrode layer 50B provided at this portion is preferably, for example, about 3 μm or more and about 40 μm or less at the center portion in the length direction L and the stacking direction T of the second foundation electrode layer 50B provided at this portion.

It should be noted that the first foundation electrode layer 50A and the second foundation electrode layer 50B are not limited to the fired layer, and each may be a thin film layer. The thin film layer is formed by a thin film forming method, such as, for example, a sputtering method or a vapor deposition method, and is, for example, a layer having a thickness of about 1 μm or less on which metal particles are deposited. Alternatively, the first plated layer 70A and the second plated layer 70B described later may be directly provided on the multilayer body 10 without providing the first foundation electrode layer 50A and the second foundation electrode layer 50B.

The first plated layer 70A covers the first foundation electrode layer 50A. The first plated layer 70A includes, for example, a first Ni-plated layer 71A as a first lower plated layer, and a first Pd-plated layer 72A disposed on the first Ni-plated layer 71A.

The second plated layer 70B covers the second foundation electrode layer 50B. The second plated layer 70B includes, for example, a second Ni-plated layer 71B as a second lower plated layer, and a second Pd-plated layer 72B disposed on the second Ni-plated layer 71B.

Here, the basic configuration of each layer of the first external electrode 40A and the second external electrode 40B is the same or substantially the same. Furthermore, the first external electrode 40A and the second external electrode 40B are plane symmetric or substantially plane symmetric with respect to the WT cross-section at the center in the length direction L of the multilayer ceramic capacitor 1. Therefore, in a case in which it is not necessary to particularly distinguish between the first external electrode 40A and the second external electrode 40B, they may be collectively referred to as an external electrode 40. Furthermore, in a case in which it is not necessary to particularly distinguish between the first foundation electrode layer 50A and the second foundation electrode layer 50B, they may be collectively referred to as a foundation electrode layer 50. Furthermore, in a case in which it is not necessary to particularly distinguish between the first plated layer 70A and the second plated layer 70B, they may be collectively referred to as a plated layer 70. Furthermore, in a case in which it is not necessary to particularly distinguish between the first Ni-plated layer 71A (the first lower plated layer 71A) and the second Ni-plated layer 71B (the second lower plated layer 71B), they may be collectively referred to as a Ni-plated layer 71 (lower plated layer 71). Furthermore, in a case in which it is not necessary to particularly distinguish between the first Pd-plated layer 72A and the second Pd-plated layer 72B, they may be collectively referred to as a Pd-plated layer 72.

Figure 7:
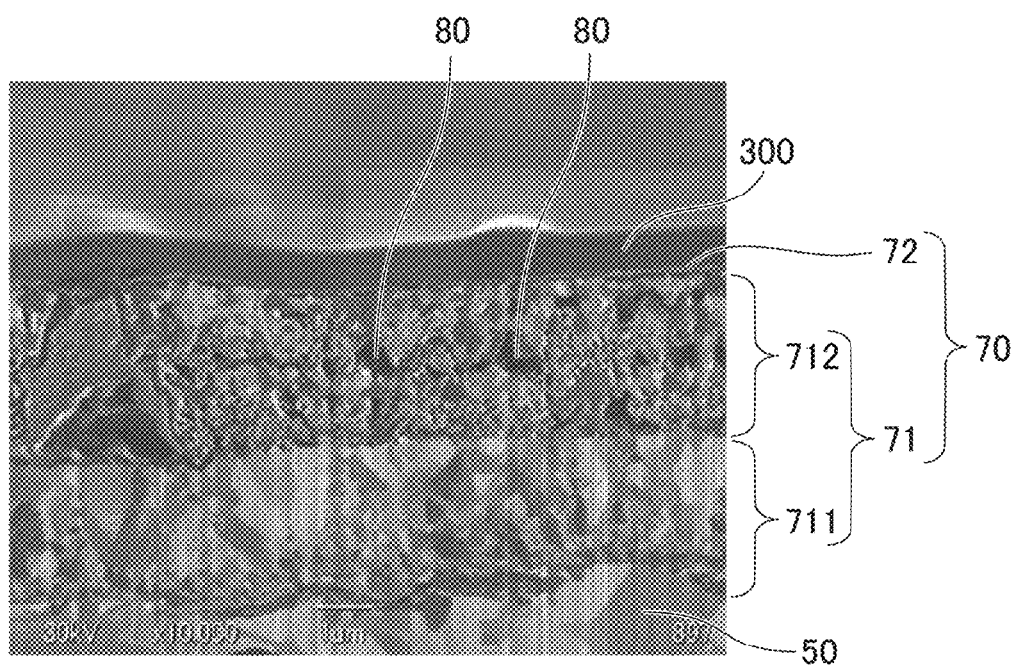
FIG. 7 is an SEM image (10,000×) of a cross section of a plated layer of an external electrode according to a preferred embodiment of the present invention.
Figure 8:
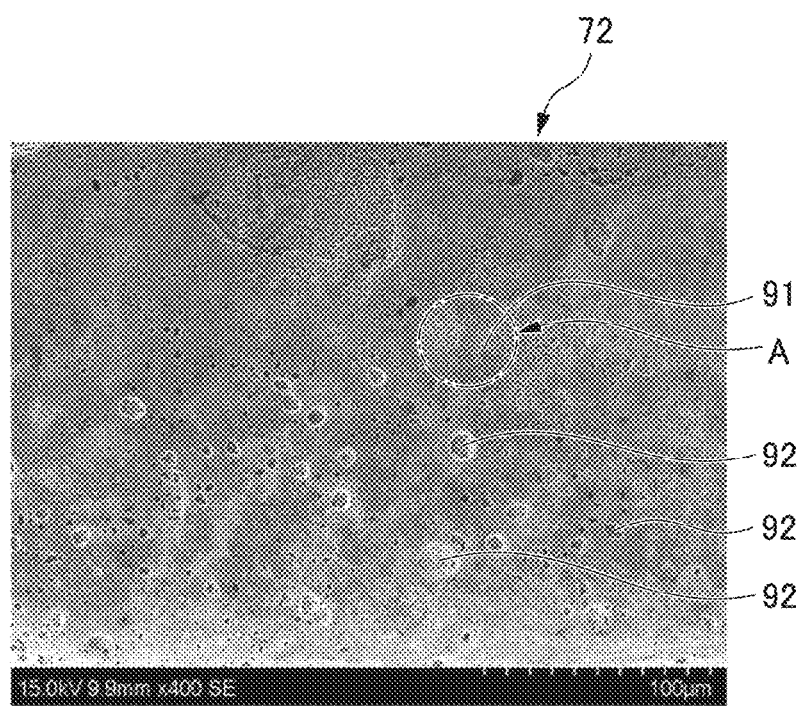
FIG. 8 is an SEM image (400×) of a surface of a Pd-plated layer of an external electrode according to a preferred embodiment of the present invention.
Figure 9:
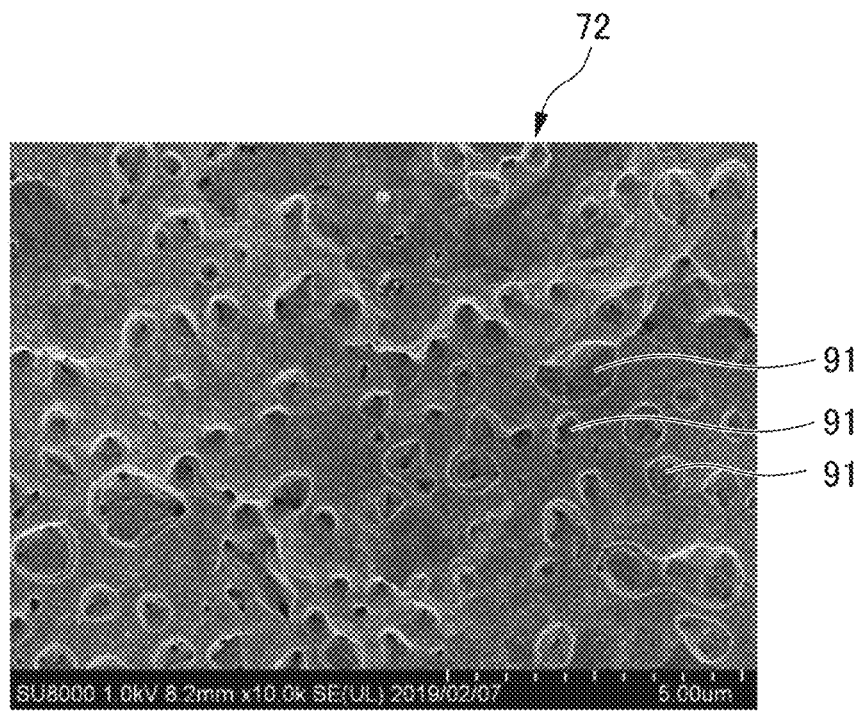
FIG. 9 is an SEM image (10,000×) of a surface of a Pd-plated layer of an external electrode of a preferred embodiment of the present invention.

Next, the state of the plated layer 70 will be described with reference to images of the scanning electron microscope (SEM) of FIGS. 7 to 9. FIG. 7 is an SEM image (10,000×) of a cross section of the plated layer 70 of the present preferred embodiment. FIG. 8 is an SEM image (400×) of a surface of the Pd-plated layer 72 of the present preferred embodiment. FIG. 9 is an SEM image (10,000×) of a surface of the Pd-plated layer 72 of the present preferred embodiment. As described above, since the basic configurations of the first plated layer 70A and the second plated layer 70B are the same, they will be collectively described as a plated layer 70 with reference to FIGS. 7 to 9.

As shown in the cross-sectional SEM image of FIG. 7, the plated layer 70 is disposed on the foundation electrode layer 50. Furthermore, the plated layer 70 includes the Ni-plated layer 71 as a lower plated layer, and the Pd-plated layer 72 disposed on the Ni-plated layer 71. It should be noted that, in FIG. 7, the lower side of the drawing corresponds to the side of the multilayer body 10, and the upper side of the drawing corresponds to the surface layer side of the plated layer 70. It should be noted that the reference numeral 300 in FIG. 7 denotes carbon vapor-deposited when produced as a sample for SEM observation.

The Ni-plated layer 71 (the lower plated layer 71) includes a dense region 711 as a lower layer region, and a porous region 712 as an upper layer region in order from the side of the multilayer body 10. Here, the dense region 711 is also referred to as a dense plated layer 711. Furthermore, the porous region 712 is also referred to as a porous plated layer 712.

The dense region 711 improves moisture resistance reliability of the multilayer ceramic capacitor 1. That is, the dense region 711 reduces or prevents moisture or the like in the atmosphere from entering the vicinity of the internal electrode layer 30 of the multilayer body 10. Thus, it is possible to reduce or prevent the electrical characteristics of the multilayer ceramic capacitor 1 from being lowered.

The dense region 711 includes a dense Ni-plated layer. As also shown in the SEM image of FIG. 7, the dense region 711 includes few voids. The porosity of the dense region 711 is preferably about 1% or less, for example, in order to ensure moisture resistance reliability.

Furthermore, the thickness of the dense region 711 is preferably about 1 μm or more, for example in order to ensure moisture resistance reliability. For example, the thickness of the dense region 711 is preferably, for example, about 1 μm or more and about 3 μm or less.

The porous region 712 is disposed on the dense region 711. In the present preferred embodiment, a boundary exists between the dense region 711 and the porous region 712. The porous region 712 defines and functions as a foundation layer for forming a predetermined recess on the surface of the Pd-plated layer 72 provided as the outermost layer of the external electrode 40. The surface state of the Pd-plated layer 72 resulting from the surface state of the porous region 712 has a good effect on the improvement of the fixing strength between the external electrode and the conductive adhesive.

The porous region 712 includes a porous Ni-plated layer including many voids 80. As also shown in the SEM image of FIG. 7, voids 80 exist in the porous region 712. Although the shape and size of the voids 80 vary, the dimension of the voids 80 in the thickness direction of the Ni-plated layer 71 is preferably, for example, about 0.1 μm or more and about 0.5 μm or less. However, the voids 80 with a dimension greater than about 0.5 μm are also allowable. The porosity of the porous region 712 is larger than the porosity of the dense region 711. The porosity of the porous region 712 is preferably about 5% or more, for example. More preferably, the porosity of the porous region 712 is 10% or more, for example. For example, the porosity of the porous region 712 is about 5% or more, and about 50% or less.

The thickness of the porous region 712 is preferably about 1 μm or more, for example, in order to provide predetermined recesses on the surface of the Pd-plated layer 72, which will be described later. More preferably, the thickness of the porous region 712 is about 2 μm or more, for example. For example, the thickness of the porous region 712 is about 1 μm or more and about 4 μm or less.

It should be noted that, since many voids 80 are present in the porous region 712, many recesses are present on the surface of the Ni-plated layer 71 before covering the Pd-plated layer 72 to be described later. However, since the dense region 711 exists in the lower layer region of the porous region 712, many recesses on the surface of the porous region 712 do not extend to the foundation electrode layer 50. Furthermore, many voids 80 existing in the porous region 712 do not extend to the foundation electrode layer 50. Therefore, it is possible to prevent moisture or the like in the atmosphere from entering the vicinity of the internal electrode layer 30 of the multilayer body 10.

Here, the recesses on the surface of the Ni-plated layer 71, i.e., recesses defining and functioning as a base of recesses (described later) on the surface of the Pd-plated layer 72 before the Pd-plated layer 72 is formed, are referred to as foundation recesses. The foundation recesses include a plurality of first foundation recesses of relatively small size and a plurality of second foundation recesses of relatively large size. The first foundation recesses each preferably have a circle equivalent diameter of, for example, about 0.5 μm or more and about 4 μm or less of an opening on the surface of the Ni-plated layer 71. The second foundation recesses each preferably have a circle equivalent diameter of, for example, about 10 μm or more and about 22 μm or less of the opening on the surface of the Ni-plated layer 71. The first foundation recesses and the second foundation recesses are in a mixed state.

The number of the first foundation recesses per predetermined area is greater than the number of the second foundation recesses. The first foundation recesses exist on the surface of the Ni-plated layer 71 with the existence probability of about 10 or more per 100 μm$^2$, for example. The second foundation recesses exist on the surface of the Ni-plated layer 71 with the existence probability of about 5 or more per 1×10$^5$ μm$^2$, for example. The many recesses on the surface of the Pd-plated layer 72 to be described later with reference to FIGS. 8 and 9 reflect the shape and the like of many foundation recesses on the surface of the Ni-plated layer 71.

Furthermore, due to such presence of many recesses, the arithmetic mean height Sa of the surface of the Ni-plated layer 71 before providing the Pd-plated layer 72 is preferably about 0.5 μm or more, for example. More preferably, the arithmetic mean height Sa of the surface of the Ni-plated layer 71 is about 0.7 μm or more, for example. Furthermore, the maximum height Sz of the surface of the Ni-plated layer 71 before providing the Pd-plated layer 72 is preferably about 3 μm or more, for example. More preferably, the maximum height Sz of the surface of the Ni-plated layer 71 is about 5 μm or more, for example.

It should be noted that the thickness of the Ni-plated layer 71 including the dense region 711 and the porous region 712 is preferably about 2 μm or more, for example. More preferably, the thickness of the Ni-plated layer 71 is about 3 μm or more, for example. For example, the thickness of the Ni-plated layer 71 is about 2 μm or more and about 7 μm or less. Furthermore, the porosity of the Ni-plated layer 71 at least in the region of about 1 μm on the upper layer side is preferably about 5% or more and about 50% or less, for example. More preferably, the porosity in the region of at least about 2 μm on the upper layer side is about 5% or more and about 50% or less, for example.

It should be noted that the Ni-plated layer 71 preferably includes the dense region 711 and the porous region 712. However, it may not necessarily include them. Even in such a case, the porosity of the Ni-plated layer 71 at least in the region of about 1 μm on the upper layer side is preferably about 5% or more and about 50% or less, for example. More preferably, the porosity of the Ni-plated layer 71 at least in the region of about 2 μm on the upper layer side is about 5% or more and about 50% or less, for example. It should be noted that the porosity may be a configuration which continuously or step-wise rises toward the upper layer side from the lower layer side of the Ni-plated layer 71. It should be noted that, in a case in which the Ni-plated layer 71 includes only the porous region 712, in order to ensure high moisture resistance reliability, it is preferable to provide a configuration to ensure the sealing property by a layer other than the Ni-plated layer 71 of the external electrode 40.

It should be noted that, as described above, the Ni-plated layer 71 can define and function as the lower plated layer. In a case in which the lower plated layer is the Ni-plated layer 71, it is possible to provide the porous region 712 on the upper layer side while ensuring high sealing property by forming the dense region 711 on the lower layer side. However, the lower plated layer may be another type of plated layer.

The dense region 711 and the porous region 712 can be made of the same type of plated layer. For example, the dense region 711 includes a dense plated layer 711 made of a first metal, and the porous region 712 also includes a porous plated layer 712 made of the same first metal. As a result, the same type of plating process can be performed continuously, and therefore, can facilitate the manufacturing process.

It should be noted that the dense region 711 and the porous region 712 may include different types of plated layers from each other. For example, the dense region 711 may include the dense plated layer 711 made of a first metal, and the porous region 712 may include the porous plated layer 712 made of a second metal different from the first metal.

The Pd-plated layer 72 is disposed on the Ni-plated layer 71, and defines the outermost layer of the external electrode 40. It should be noted that, in the present preferred embodiment, the Pd-plated layer 72 is disposed directly on the Ni-plated layer 71 so as to contact the Ni-plated layer 71. The Pd-plated layer 72 has excellent heat resistance and corrosion resistance. Therefore, the Pd-plated layer 72 is suitable as the outermost layer of the external electrode 40 of the multilayer ceramic capacitor 1 to be mounted on the mounting substrate 210 using the conductive adhesive 240.

The Pd-plated layer 72 covers the entire or substantially the entire surface of the Ni-plated layer 71. The Pd-plated layer 72 preferably covers the Ni-plated layer 71 with a coverage of about 95% or more, for example. More preferably, the Pd-plated layer 72 covers the Ni-plated layer 71 with a coverage of about 99% or more, for example. Thus, the Pd-plated layer 72 covers the Ni-plated layer with high coverage. That is, holes intended to expose the Ni-plated layer 71 are not present in the Pd-plated layer. Therefore, it is possible to prevent oxidation of Ni by exposure of the Ni-plated layer 71, and increase in electrical resistance accompanied therewith. More preferably, the Pd-plated layer 72 completely covers the Ni-plated layer 71.

In order to cover the Ni-plated layer 71 with high coverage, the thickness of the Pd-plated layer 72 is preferably about 0.025 μm or more, for example. More preferably, the thickness of the Pd-plated layer 72 is about 0.05 μm or more, for example. It should be noted that Pd is a very expensive metal. Therefore, if the use of Pd increases by thickening the Pd-plated layer 72, the cost will increase. Therefore, the thickness of the Pd-plated layer 72 is preferably smaller than about 1 μm, for example. More preferably, the thickness of the Pd-plated layer 72 is about 0.2 μm or less, for example. More preferably, the thickness of the Pd-plated layer 72 is about 0.15 μm or less, for example. Thus, the dimension of the thickness of the Pd-plated layer 72 is preferably smaller than the dimension of the thickness of the porous region 712. It should be noted that the thickness of the Pd-plated layer 72 may be smaller than about 0.025 μm, for example.

Next, the state of the surface of the Pd-plated layer 72 will be described using the SEM image of FIG. 8 (400×) and the SEM image of FIG. 9 (10,000×).

As shown in FIG. 8, many recesses 91, 92 are provided on the surface of the Pd-plated layer 72. The many recesses reflect the shape or the like of many foundation recesses on the surface of the Ni-plated layer 71 due to the voids 80 in the porous region 712 of the Ni-plated layer 71. Since the Pd-plated layer 72 is relatively thin, the many recesses reflecting the state of the surface of the Ni-plated layer 71 are also provided on the surface of the Pd-plated layer 72.

The many recesses include a plurality of first recesses 91 of relatively small size and a plurality of second recesses 92 of relatively large size. For example, in the portion A in FIG. 8, there are many first recesses 91 of significantly small size. In the SEM image of FIG. 8, a plurality of second recesses 92 can be confirmed. FIG. 9 is an SEM image obtained by magnifying and observing the many first recesses 91.

The first recesses 91 have the circle equivalent diameter of, for example, about 0.5 μm or more and about 4 μm or less of the opening on the surface of the Pd-plated layer 72. The second recesses 92 have a circle equivalent diameter of, for example, about 10 μm or more and about 22 μm or less of the opening on the surface of the Pd-plated layer 72. The first recesses 91 and the second recesses 92 are in a mixed state.

The number of the first recesses 91 per predetermined area is larger than the number of the second recesses 92. The first recesses 91 exist on the surface of the Pd-plated layer 72 with the existence probability of, for example, about 10 or more per 100 pmt. The second recesses 92 exist on the surface of the Pd-plated layer 72 with the existence probability of, for example, about 5 or more per $1 \times 10^5$ μm$^2$.

As described above, many recesses exist on the surface of the Pd-plated layer 72. The many recesses preferably include the first recesses 91 each having the opening equivalent diameter of about 0.5 μm or more and about 4 μm or less, and the second recesses 92 each having the opening equivalent diameter of about 10 μm or more and about 22 μm or less, for example. The number of first recesses 91 is larger than the number of second recesses 92. The plurality of second recesses 92 are in a mixed state with the many first recesses 91.

In the present preferred embodiment, since the Ni-plated layer 71 includes the porous region 712, the surface of the Ni-plated layer 71 has a rough surface including many foundation recesses. Furthermore, since the Ni-plated layer 71 is covered by the thin Pd-plated layer 72, the surface of the Pd-plated layer 72 also has a rough surface including many recesses.

Furthermore, the arithmetic mean height Sa of the surface of the Pd-plated layer 72 is preferably, for example, about 0.3 μm or more due to the presence of such many recesses. More preferably, the arithmetic mean height Sa of the surface of the Pd-plated layer 72 is about 0.5 μm or more, for example. Furthermore, the maximum height Sz of the surface of the Pd-plated layer 72 is preferably, for example, about 2 μm or more. More preferably, the maximum height Sz of the surface of the Pd-plated layer 72 is about 3 μm or more, for example.

For example, it is preferable that the maximum height Sz of the surface of the Pd-plated layer 72 is, for example, about 1 μm or more, while the thickness of the Pd-plated layer 72 is reduced to, for example, less than about 1 μm. Thus, a surface is achieved which has the maximum height Sz of the surface of the Pd-plated layer 72 larger than the dimension of the thickness of the Pd-plated layer 72. More preferably, for example, the thickness of the Pd-plated layer 72 is smaller than about 1 μm, and the maximum height Sz of the surface of the Pd-plated layer 72 is about 2 μm or more. In this case, a surface is provided which has the maximum height Sz of the surface of the Pd-plated layer 72 about two times or more the thickness of the Pd-plated layer 72. More preferably, the thickness of the Pd-plated layer 72 is, for example, about 0.2 μm or less, and the maximum height Sz of the surface of the Pd-plated layer 72 is, for example, about 2 μm or more. In this case, a surface is provided such that the maximum height Sz of the surface of the Pd-plated layer 72 is preferably, for example, about ten times or more the thickness of the Pd-plated layer 72. Thus, by making the surface of the Ni-plated layer 71 as a lower plated layer to be a rough surface, and providing a thin Pd-plated layer 72 thereon, it is possible to reduce the used amount of Pd, and also make the surface of the Pd-plated layer 72 to be a rough surface. As a result, it is possible to reduce the product cost and improve the fixing strength between the external electrode 40 and the conductive adhesive 240. It should be noted that a preferable range of the maximum height Sz of the surface of the Pd-plated layer 72 is about 2 μm or more and about 4 μm or less, for example. A more preferable range thereof is 3 μm or more and 4 μm or less.

As described above, by providing a rough surface on the surface of the Pd-plated layer 72 defining the outermost layer of the external electrode 40, it is possible to ensure high fixing strength between the external electrode 40 and the conductive adhesive 240. The many recesses are provided on the surface of the Pd-plated layer 72 of the present preferred embodiment. The many recesses include first recesses 91 having an opening equivalent diameter of about 0.5 μm or more and about 4 μm or less, and second recesses 92 having an opening equivalent diameter of about 10 μm or more and about 22 μm or less, for example. The number of first recesses 91 is larger than the number of second recesses 92. The plurality of second recesses 92 are in a mixed state with the first recesses 91. Thus, an increase in the contact area with the conductive adhesive 240, an anchor effect on the conductive adhesive 240, and the like are achieved, a result of which the fixing strength can be increased. Here, the second recesses 92 having a relatively large size greatly contributes to the increase of the fixing strength. On the other hand, when the recesses of such a large size are present at a high density, the rise of the adjacent recesses overlap, a result of which a large edge portion having a difference in height tends to form on the surface. In this case, the Pd-plated layer 72 is likely to peel off with such an edge portion as the starting point, and there is a possibility that the lower plated layer is exposed. In the present preferred embodiment, the first recesses 91 having relatively small sizes are present in a larger number than the second recesses 92 in a state of being mixed with the second recesses 92. The effect of increasing the fixing strength due to the presence of the relatively small-sized first recesses 91 present in the large number compensates for the effect of increasing the fixing strength due to the presence of the second recesses 92, thus achieving an increase in the overall fixing strength.

Hereinafter, methods of measuring various parameters in the present preferred embodiment will be described.

A method of measuring the circle equivalent diameter of the opening of the recesses will be described. Here, the circle equivalent diameter indicates the diameter of a true circle corresponding to an area of a measurement target portion. In the present preferred embodiment, the diameter corresponding to the circle of the opening of the recesses as the measurement target portion existing on the surface of the Pd-plated layer 72 as a target region is measured by the following method. First, the surface of the Pd-plated layer 72 as the target region is observed by SEM. Next, by the analysis of the SEM image, the opening of the recesses as the measurement target portion is identified. Thereafter, based on the area of the opening of the identified recesses, the circle equivalent diameter of the opening of the recesses is calculated. It should be noted that the observation range for measuring the first recesses 91 is about 10 μm × about 10 μm. On the other hand, the observation range for measuring the second recesses 92 is about 300 μm × about 300 μm. It should be noted that the same method is to measure the circle equivalent diameter of the opening of the foundation recesses on the surface as the measurement target portion with the Ni-plated layer 71 as the target region.

A method of measuring the number of recesses will be described. In the present preferred embodiment, the number of the first recesses 91 and the second recesses 92 as the measurement target portion existing on the surface of the Pd-plated layer 72 as the target region is measured by the following method. First, the surface of the Pd-plated layer 72 as the target region is observed by SEM. Next, by analyzing the SEM image, the first recesses 91 or the second recesses 92 as the measurement target portion are identified. Thereafter, the number of identified first recesses 91 or second recesses 92 is counted. It should be noted that the observation range when counting the number of the first recesses 91 is about 10 μm × about 10 μm. On the other hand, the observation range when counting the number of the second recesses 92 is about 300 μm × about 300 μm. Furthermore, the number of the first recesses 91 and the number of the second recesses 92 per predetermined area in the target region are obtained as the respective existence probabilities. It should be noted that the same method is used to measure the number of foundation recesses present on the Ni-plated layer 71 as the measurement target portion with the Ni-plated layer 71 as the target region.

A method of measuring the coverage will be described. Here, the coverage is a ratio between the area of the target region and the area of the region where the coating covers the target region, and is also referred to as a coverage ratio. In the present preferred embodiment, a predetermined region in which the Ni-plated layer 71 is provided as a lower layer is set as a target region, and the coverage of the Pd-plated layer 72 as a coating covering the predetermined region is measured by the following method. First, the surface of the Pd-plated layer 72 is analyzed using an energy dispersive X-ray microanalyzer (EDX). Next, from the EDX analysis, elemental mapping of the surface of the target region is performed. Thereafter, based on the area of the target region and the area of the coating in the target region obtained by the elemental mapping analysis, the coverage is calculated by the following equation (1). The analysis target range is about 10 μm × about 10 μm. It should be noted that the average value of the coverage measured at five locations is defined as the coverage of the present preferred embodiment.

$$\text{Coverage (\%)} = (\text{Area of coating}/\text{Area of target region}) \times 100 \qquad (1)$$

A method of measuring the porosity will be described. Here, the porosity refers to a ratio occupied by the voids in the target region. In the present preferred embodiment, the porosity of the dense region 711 and the porous region 712 as the target regions is measured by the following method. First, the multilayer ceramic capacitor 1 including the external electrode 40 is cut along the LT cross-section as shown in FIG. 2, and the cut surface is subjected to surface precision polishing by focused ion beam (FIB) processing. Next, the cross section of the polished external electrode 40 is observed by SEM. Thereafter, voids are identified by the analysis of the SEM image. Thereafter, based on the area of the target region in the SEM image and the area of the voids in the target region, the porosity is calculated by the following equation (2). The observation range is set to about 10 μm × about 10 μm, and the target region within the range is analyzed to calculate the porosity. It should be noted that the average value of the porosity measured at five locations is defined as the porosity of the present preferred embodiment.

$$\text{Porosity (\%)} = (\text{Area of void}/\text{Area of target region}) \times 100 \qquad (2)$$

A method of measuring the thickness of a layer, such as a plated layer, will be described. In the present preferred embodiment, a measurement is performed by the following method with the thickness of the dense region 711 of the Ni-plated layer 71, the porous region 712 of the Ni-plated layer 71, the Ni-plated layer 71, and the Pd-plated layer 72 as the measurement target layer. First, the multilayer ceramic capacitor 1 including the external electrode 40 is cut along the LT cross-section as shown in FIG. 2, the cut surface is subjected to surface precision polishing by focused ion beam (FIB) processing. Next, the cross section of the polished external electrode 40 is observed by SEM. Thereafter, five lines are drawn so as to be perpendicular or substantially perpendicular to the extending direction of the surface of the measurement target layer at equal or substantially equal intervals, to measure the thickness of the measurement target layer on the five lines. Thereafter, the average value of the thickness of the measurement target layer on the five lines is defined as the thickness of the measurement target layer of the present preferred embodiment. The observation range is about 10 μm × about 10 μm.

A method of measuring the arithmetic mean height Sa of the surface will be described. Here, the arithmetic mean height Sa of the surface is an extension of the arithmetic mean roughness Ra (arithmetic mean height of the lines) to the plane, and is measured by a measurement method conforming to ISO25178. In the present preferred embodiment, the arithmetic mean height Sa of the surfaces of the Pd-plated layer 72 and the Ni-plated layer 71 as measurement targets is measured by the following method. First, a sample as a measurement target is provided. Next, the measurement target range of the sample is measured by a measurement method conforming to ISO25178 using a non-contact, measurable laser microscopy. In the present preferred embodiment, NewView8300 available from Zygo Corporation was used. The measurement target range is about 50 μm × about 50 μm. It should be noted that the average value of the arithmetic mean height Sa of the surface measured at five locations is defined as the arithmetic mean height Sa of the surface of the present preferred embodiment.

A method of measuring the maximum height Sz of the surface will be described. Here, the maximum height Sz of the surface is an extension of the maximum height Rz (maximum height of the line) to the plane, and is measured by a measurement method conforming to ISO25178. In the present preferred embodiment, the maximum heights Sz of the surfaces of the Pd-plated layer 72 and the Ni-plated layer 71 as the measurement targets are measured by the following method. First, a sample as a measurement target is provided. Next, the measurement target range of the sample is measured by a measurement method conforming to ISO25178 using a non-contact, measurable laser microscopy. In the present preferred embodiment, NewView8300 available from Zygo Corporation was used. It should be noted that the measurement target range is about 50 μm × about 50 μm. It should be noted that the average value of the maximum heights Sz of the surfaces measured at five locations is defined as the maximum height Sz of the surface of the present preferred embodiment.

As described above, the multilayer ceramic capacitor 1 includes the multilayer body 10 including the plurality of stacked dielectric layers 20 and the plurality of stacked internal electrode layers 30, and the external electrodes 40 respectively connected to the internal electrode layers 30, in which the external electrodes 30 each include the lower plated layer 71 and the Pd-plated layer 72 provided on the lower plated layer 71, in which the plurality of recesses are provided on a surface of the Pd-plated layer 72, the plurality of recesses include first recesses 91 each having a circle equivalent diameter of an opening of about 0.5 μm or more and about 4 μm or less and second recesses 92 each having a circle equivalent diameter of an opening of about 10 μm or more and about 22 μm or less, the first recesses 91 are greater in number than the second recesses 92, and the second recesses 92 and the first recesses 91 are in a mixed state. With such a configuration, it is possible to obtain a high fixing strength between the external electrode 40 and the conductive adhesive 240.

More specifically, the multilayer ceramic capacitor 1 according to the present preferred embodiment includes the multilayer body 10 including the plurality of stacked dielectric layers 20 and the plurality of stacked internal electrode layers 30, the first main surface TS1 and the second main surface TS2 which are opposite to each other in the stacking direction T, the first side surface WS1 and the second side surface WS2 which are opposite to each other in the width direction W orthogonal or substantially orthogonal to the stacking direction T, and the first end surface LS1 and the second end surface LS2 which are opposite to each other in the length direction L orthogonal or substantially orthogonal to the stacking direction T and the width direction W. The multilayer ceramic capacitor 1 also includes the first external electrode 40A provided on the first end surface LS1, and the second external electrode 40B provided on the second end surface LS2. The plurality of internal electrode layers 30 include first internal electrode layers 31 each exposed at the first end surface LS1 of the multilayer body 10 and connected to the first external electrode 40A, and the second internal electrode layers 32 each exposed at the second end surface of the multilayer body 10 and connected to the second external electrode 40B. The first external electrode 40A includes the first lower plated layer 71A, and the first Pd-plated layer 72A provided on the first lower plated layer 71A. The second external electrode 40B includes the second lower plated layer 71B, and the second Pd-plated layer 72B provided on the second lower plated layer 71B. The plurality of recesses are provided on the surfaces of the first Pd-plated layer 72A and the second Pd-plated layer 72B. The plurality of recesses include the first recesses 91 each having a circle equivalent diameter of an opening of about 0.5 μm or more and about 4 μm or less and the second recesses 92 each having a circle equivalent diameter of an opening of about 10 μm or more and about 22 μm or less. The first recesses 91 are greater in number than the second recesses 92. The second recesses 92 and the first recesses 91 are present in a mixed state. With such a configuration, it is possible to obtain a high fixing strength between the external electrode 40 and the conductive adhesive 240.

Furthermore, the multilayer ceramic capacitor 1 according to the present preferred embodiment includes the multilayer body 10 including the plurality of stacked dielectric layers 20 and the plurality of stacked internal electrode layers 30, and the external electrodes 40 each connected to the internal electrode layers 30. The external electrodes 40 each include the lower plated layer 71 (the Ni-plated layer 71) and the Pd-plated layer 72 provided on the lower plated layer 71. The lower plated layer 71 includes a dense region and a porous region in order from the side of the multilayer body. With such a configuration, it is possible to obtain a high fixing strength between the external electrode 40 and the conductive adhesive 240. For example, even when the thickness of the Pd-plated layer 72 is reduced, it is still possible to make the surface of the Pd-plated layer 72 a rough surface, as a result of which it is possible to achieve both cost reduction and high fixing strength. Furthermore, it is possible to make the surface of the Pd-plated layer 72 rough without performing any special rough surface forming process on the Pd-plated layer 72 itself. Therefore, the lower plated layer is no longer exposed due to the additional rough surface formation processing on the Pd-plated layer 72. In addition, Pd is no longer unnecessarily discarded due to Pd being removed by the additional rough surface formation processing on the Pd-plated layer 72.

Furthermore, the multilayer ceramic capacitor 1 according to the present preferred embodiment includes the multilayer body 10 including the plurality of stacked dielectric layers 20 and the plurality of stacked internal electrode layers 30, and the external electrodes 40 each connected to the internal electrode layers 30. The external electrodes 40 each include the lower plated layer 71 (the Ni-plated layer 71) and the Pd-plated layer 72 provided on the lower plated layer 71. The maximum height Sz of the surface of the Pd-plated layer 72 is greater than the thickness of the Pd-plated layer 72. With such a configuration, it is possible to obtain a high fixing strength between the external electrode 40 and the conductive adhesive 240. More specifically, it is possible to make the surface of the Pd-plated layer 72 rough, thus obtaining high fixing strength while achieving cost reduction by reducing the amount of Pd, which is expensive metal.

In addition, when defining the dimension in the length direction of the multilayer ceramic capacitor 1 including the multilayer body 10 and the external electrode 40 as the L dimension, the L dimension is preferably about 0.5 mm or more and about 5.8 mm or less, for example. In addition, when defining the dimension in the stacking direction of the multilayer ceramic capacitor 1 as the T dimension, the T dimension is preferably about 0.2 mm or more and about 2.0 mm or less, for example. Furthermore, when defining that the dimension in the width direction of the multilayer ceramic capacitor 1 as the W dimension, the W dimension is preferably about 0.2 mm or more and about 5.0 mm or less, for example.

Next, a non-limiting example of a method of manufacturing the multilayer ceramic capacitor 1 of the present preferred embodiment will be described.

A dielectric sheet for the dielectric layer 20 and a conductive paste for the internal electrode layer 30 are provided. The conductive paste for the dielectric sheet and the internal electrode includes a binder and a solvent. Known binders and solvents may be used.

On the dielectric sheet, the conductive paste for the internal electrode layer 30 is printed in a predetermined pattern by, for example, screen printing or gravure printing. Thus, the dielectric sheet in which the pattern of the first internal electrode layer 31 is formed, and the dielectric sheet in which the pattern of the second internal electrode layer 32 is formed are provided.

A predetermined number of dielectric sheets in which the pattern of the internal electrode layer is not printed are stacked to define the first main surface-side outer layer portion 12 on the side of the first main surface TS1 is formed. On top thereof, by the dielectric sheet in which the pattern of the first internal electrode layer 31 is printed and the dielectric sheet in which the pattern of the second internal electrode layer 32 is printed are sequentially stacked to define the inner layer portion 11 is formed. On the portion defining the inner layer portion 11, predetermined number of the dielectric sheets in which the pattern of the internal electrode layer is not printed are stacked to define the second main surface-side outer layer portion 13 on the side of the second main surface TS2 is formed. Thus, a stacked sheet is produced.

By the stacked sheet being pressed in the stacking direction by hydrostatic pressing, for example, a stacked block is produced.

By the stacked block being cut to a predetermined size, a laminated (multilayer) chip is cut out. At this time, corners and ridges of the laminated chip may be rounded by barrel polishing or the like.

The laminated chip is fired to produce the multilayer body 10. The firing temperature depends on the materials of the dielectric layer 20 and the internal electrode layer 30. However, the firing temperature is preferably about 900° C. or more and about 1400° C. or less, for example.

The conductive paste used for the foundation electrode layer 50 is applied to both end surfaces of the multilayer body 10. In the present preferred embodiment, the foundation electrode layer 50 is a fired layer. For example, a conductive paste including a glass component and metal is applied to the multilayer body 10 by, for example, a method such as dipping. Thereafter, a firing process is performed to form the foundation electrode layer 50. The temperature of the firing process at this time is preferably about 700° C. or higher and about 900° C. or lower, for example.

Next, the plated layer 70 is formed. It should be noted that the plated layer 70 may be formed on the surface of the foundation electrode layer 50, or may be formed directly on the multilayer body 10. In the present preferred embodiment, the plated layer 70 is formed on the surface of the foundation electrode layer 50. More particularly, on the foundation electrode layer 50, the Ni-plated layer 71 (the lower plated layer 71) and the Pd-plated layer 72 are formed. Upon performing the plating process, for example, electrolytic plating or electroless plating may be adopted. However, since pretreatment with a catalyst or the like is required for electroless plating to improve the plating deposition rate, there is a disadvantage in that the process becomes complicated. Therefore, normally, electrolytic plating is preferably used.

First, on the foundation electrode layer 50, the dense region 711 of the Ni-plated layer 71 (dense plated layer 711) is formed. Next, on the dense region 711, the porous region 712 (porous plated layer 712) is formed. The dense region 711 and the porous region 712 of the Ni-plated layer 71 is formed by, for example, a barrel plating method.

In the barrel plating method, first, a plating bath filled with a plating solution, a cathode electrode, and an anode electrode are prepared. Next, a plating voltage is applied between the cathode electrode and the anode electrode in the plating solution. At this time, energization is performed so that the foundation electrode layer 50 and the cathode electrode provided in the multilayer body 10 are in contact with each other. Thus, plating is deposited on the foundation electrode layer 50, and the plated layer is formed. It should be noted that a conductive medium may be disposed in the plating bath together with the multilayer body 10 in which the foundation electrode layer 50 is provided, and electrical conduction may be performed in the foundation electrode layer 50 via the conductive medium. It should be noted that there are various ways of performing electrical conduction. For example, as a way to perform electrical conduction, vibration plating for plating by stirring the multilayer body 10 and the conductive media by vibration, rotating barrel plating for plating while rotating and stirring the conductive media and the multilayer body 10 placed in a barrel, or centrifugal plating for plating by stirring the multilayer body 10 by centrifugal force of a barrel may be used.

It should be noted that the conditions for the plating step when forming the dense region 711 (the dense plated layer 711) differ from the conditions for the plating step when forming the porous region 712 (the porous plated layer 712). The coarse and dense states of the completed plated layer differ depending on, for example, the composition of the plating solution used, and the state of the voltage applied between the cathode electrode and the anode electrode. For example, in the present preferred embodiment, in the plating process for forming the dense regions 711, plated layers are preferably formed using a Ni plating bath including Ni sulfate, Ni chloride, boron, and a stress-relieving agent, and adjusting the current density in the range of about 0.1 to about 0.3 A/dm$^2$, for example. On the other hand, in the plating process for forming the porous regions 712, plated layers are preferably formed using a Ni plating bath including Ni sulfate, Ni chloride, boron, and an additive that inhibits Ni plating growth, and adjusting the current density in the range of about 0.1 to about 0.3 A/dm$^2$, for example.

In addition, in the plating process for forming the porous regions 712, plated layers are formed using a Ni plating bath including Ni sulfate, Ni chloride, boron, and an additive that inhibits Ni plating growth, and adjusting the current density in the range of about 0.1 to about 0.3 A/dm$^2$, for example. As a result, at the time of plating deposition, growth inhibition of Ni plating due to adhesion of organic matter occurs, and a large number of minute foundation recesses are formed on the surface of the plated layer. More specifically, the large number of first foundation recesses each having the circle equivalent diameter of the opening of about 0.5 μm or more and about 4 μm or less, for example, are formed on the surface of the plated layer. Then, with the large number of first foundation recesses formed, due to the physical impact applied to the surface of the plated layer during plating deposition, Ni particles partially fall off in a portion where the large number of minute foundation recesses are formed, as a result of which the plurality of second foundation recesses having relatively large sizes having the circle equivalent diameter of the opening of about 10 μm or more and about 22 μm or less, for example are formed. As a result, the first foundation recesses and the second foundation recesses are formed in a mixed state, and the number of the second foundation recesses is smaller than the number of the first foundation recesses. As described above, by adjusting the conditions for the plating processes, it is possible to form the dense region 711 and the porous region 712.

Thereafter, the Pd-plated layer 72 is formed by a barrel plating method. At this time, on the porous region 712 of the Ni-plated layer 71, a thin Pd-plated layer 72 is formed. Thus, on the surface of the Pd-plated layer 72, the first recesses 91 having the shape or the like of the first foundation recesses on the surface of the Ni-plated layer 71 are formed. Furthermore, the second recesses 92 having the shape or the like of the second foundation recesses on the surface of the Ni-plated layer 71 are formed. The multilayer ceramic capacitor 1 of the present preferred embodiment is manufactured by the above-described manufacturing method.

As described above, the method of manufacturing the multilayer ceramic capacitor 1 of the present preferred embodiment includes a first plating step of forming the dense plated layer 711 on the multilayer body 10 or the foundation electrode layer 50 provided on the multilayer body 10 a second plating step of forming the porous plating layer 712 on the dense plated layer 711 and a third plating step of forming the Pd-plated layer 72 on the porous plated layer 712. As a result, it is possible to make the surface of the Pd-plated layer appropriately roughened by simple steps, and it is possible to obtain a high fixing strength between the external electrode 40 and the conductive adhesive 240. Furthermore, it is possible to make the surface of the Pd-plated layer 72 rough without performing any special rough surface forming process on the Pd-plated layer 72 itself. Therefore, the lower plated layer is no longer exposed due to the additional rough surface forming process for the Pd-plated layer 72. In addition, Pd is no longer unnecessarily discarded due to Pd being removed by the additional rough surface formation processing on the Pd-plated layer 72.

The configuration of the multilayer ceramic capacitor 1 is not limited to the configuration shown in FIGS. 1 to 4. For example, the multilayer ceramic capacitor 1 may include a two-portion structure, a three-portion structure, or a four-portion structure as shown in FIG. 10A, 10B, or 10C.

Figure 10A:
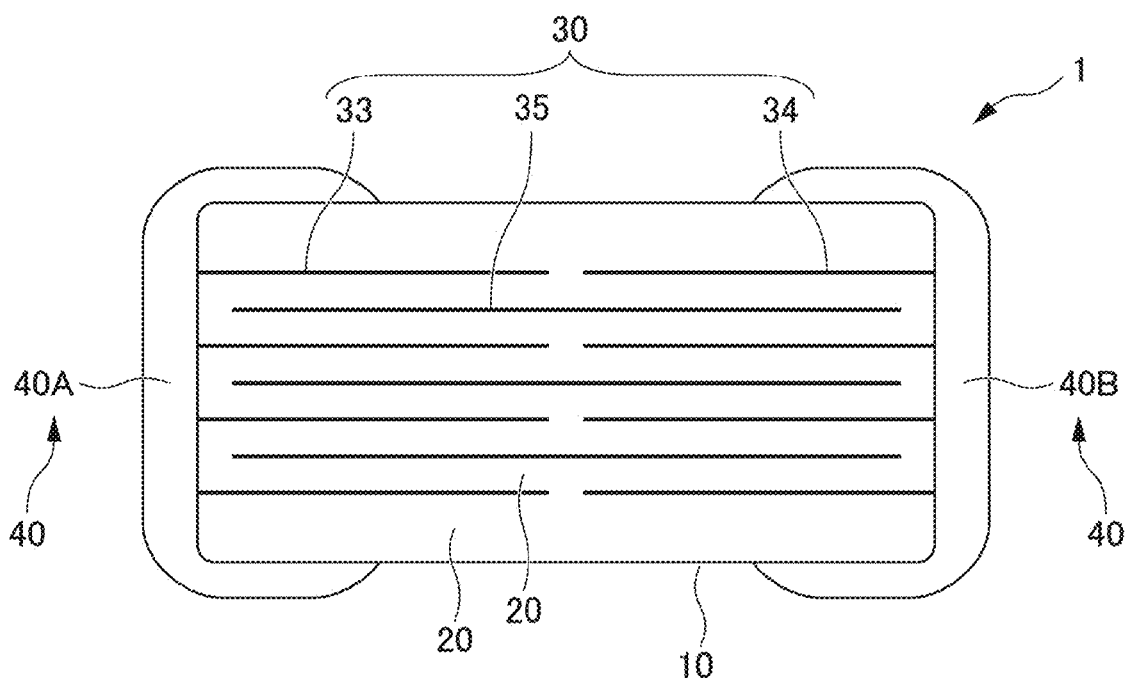
FIG. 10A is a diagram showing a multilayer ceramic capacitor having a two-portion structure according to a preferred embodiment of the present invention.
Figure 10B:
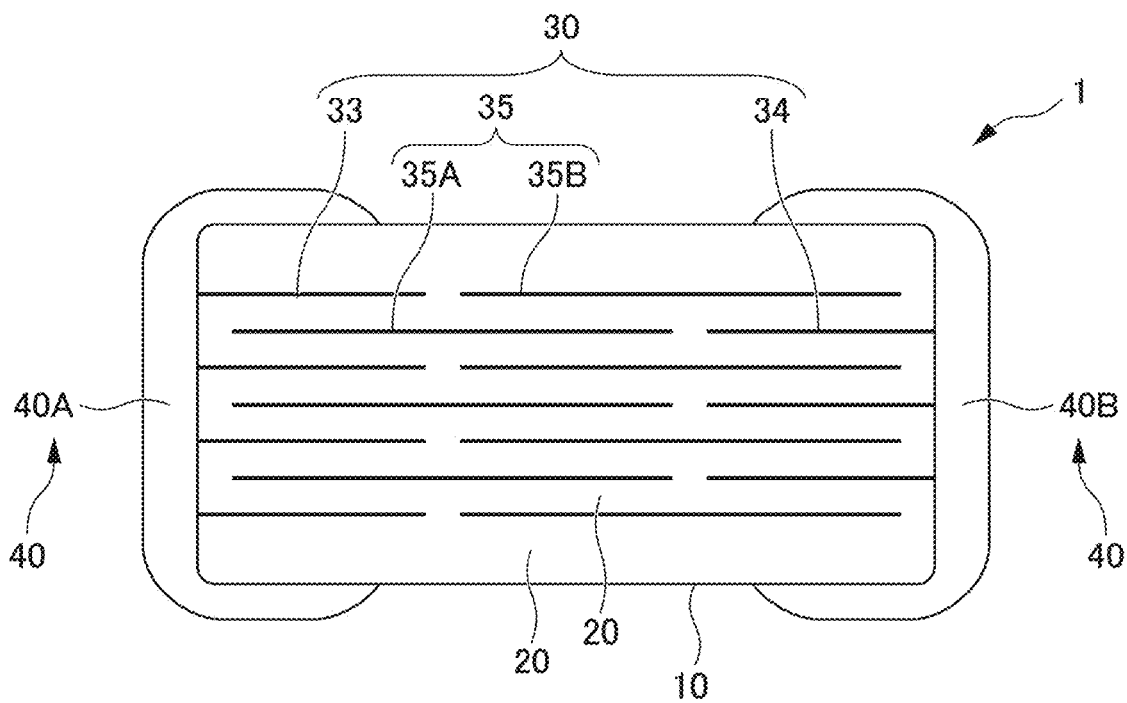
FIG. 10B is a diagram showing a multilayer ceramic capacitor having a three-portion structure according to a preferred embodiment of the present invention.
Figure 10C:
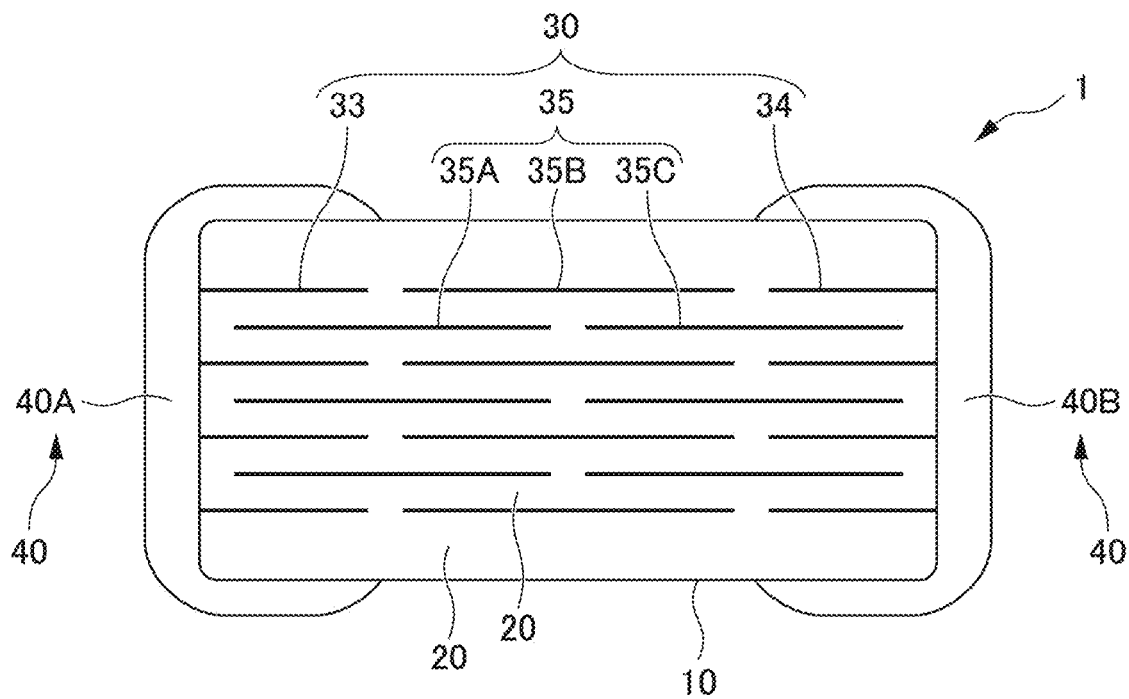
FIG. 10C is a diagram showing a multilayer ceramic capacitor having a four-portion structure according to a preferred embodiment of the present invention.

The multilayer ceramic capacitor 1 shown in FIG. 10A is a multilayer ceramic capacitor 1 including a two-portion structure. The multilayer ceramic capacitor 1 includes, as the internal electrode layer 30, a floating internal electrode layer 35 which does not extend to either side of the first end surface LS1 and the second end surface LS2, in addition to the first internal electrode layer 33 and the second internal electrode layer 34. The multilayer ceramic capacitor 1 shown in FIG. 10B includes a three-portion structure including, as the floating internal electrode layer 35, a first floating internal electrode layer 35A and a second floating internal electrode layer 35B. The multilayer ceramic capacitor 1 shown in FIG. 10C includes a four-portion structure including, as the floating internal electrode layer 35, the first floating internal electrode layer 35A, the second floating internal electrode layer 35B and a third floating internal electrode layer 35C. Thus, by providing the floating internal electrode layer 35 as the internal electrode layer 30, the multilayer ceramic capacitor 1 includes a structure in which the counter electrode portion is divided into a plurality of counter electrode portions. With such a configuration, a plurality of capacitor components are provided between the opposing internal electrode layers 30, thus providing a configuration in which these capacitor components are connected in series. Therefore, the voltage applied to the respective capacitor components becomes low, and thus, it is possible to achieve a high breakdown voltage of the multilayer ceramic capacitor 1. It should be noted that, needless to say, the multilayer ceramic capacitor 1 of the present preferred embodiment may be a multiple-portion structure including four or more portions.

It should be noted that the multilayer ceramic capacitor 1 may be a two-terminal capacitor including two external electrodes, or may be a multi-terminal capacitor including a large number of external electrodes.

According to the multilayer ceramic capacitor 1 of the present preferred embodiment, the following advantageous effects are achieved.

(1) The multilayer ceramic capacitor 1 according to the present preferred embodiment includes the multilayer body 10 including the plurality of stacked dielectric layers 20 and the plurality of stacked internal electrode layers 30, and the external electrodes 40 respectively connected to the internal electrode layers 30, in which the external electrodes 40 each include the lower plated layer 71 and the Pd-plated layer 72 provided on the lower plated layer 71, in which the plurality of recesses are provided on a surface of the Pd-plated layer 72, the plurality of recesses include first recesses 91 each having a circle equivalent diameter of an opening of about 0.5 µm or more and about 4 µm or less and second recesses 92 each having a circle equivalent diameter of an opening of about 10 µm or more and about 22 µm or less, the first recesses 91 are greater in number than the second recesses 92, and the second recesses 92 and the first recesses 91 are in a mixed state.

As a result, it is possible to obtain a high fixing strength between the external electrode 40 and the conductive adhesive 240.

(2) The external electrodes according to the present preferred embodiment each further include the foundation electrode layer 50, and the lower plated layer is provided on the foundation electrode layer 50.

Thus, it is possible to provide more reliable external electrodes 40.

(3) The lower plated layer according to the present preferred embodiment is the Ni-plated layer 71.

This makes it possible to secure a high sealing property.

(4) In the multilayer ceramic capacitor 1 according to the present preferred embodiment, the first recesses 91 are on the surface of the Pd-plated layer with an existence probability of about ten or more per 100 µm$^2$, and the second recesses 92 are on the surface of the Pd-plated layer with an existence probability of about five or more per $1 \times 10^5$ µm$^2$.

As a result, the effect of increasing the fixing strength by the first recesses 91 of relatively small size in a large number compensates for the effect of increasing the fixing strength by the second recesses 92, thus achieving an overall increase in the fixing strength.

(5) In the multilayer ceramic capacitor 1 according to the present preferred embodiment, the thickness of the Pd-plated layer 72 is less than about 1 µm, and the maximum height Sz of the surface of the Pd-plated layer 72 is about 2 µm or more.

As a result, it is possible to obtain a high fixing strength between the external electrode 40 and the conductive adhesive 240, while achieving a cost reduction by reducing the amount of Pd, which is an expensive metal.

(6) In the multilayer ceramic capacitor 1 according to the present preferred embodiment, the thickness of the lower plated layer is about 2 µm or more, and the porosity of the lower plated layer at least in a region of about 1 µm on an upper layer side is about 5% or more and about 50% or less.

As a result, it is possible to make the surface of the Pd-plated layer 72 appropriately roughened, and thus, it is possible to obtain a high fixing strength between the external electrode 40 and the conductive adhesive 240. For example, even when the thickness of the Pd-plated layer 72 is reduced, it is still possible to make the surface of the Pd-plated layer 72 a rough surface, as a result of which it is possible to achieve both a cost reduction and high fixing strength.

(7) In the multilayer ceramic capacitor according to the present preferred embodiment, the lower plated layer includes the dense region 711 and the porous region 712 in order from the side of the multilayer body, and the porosity of the dense region 711 is about 1% or less, and the porosity of the porous region 712 is about 5% or more and about 50% or less.

As a result, it is possible to make the surface of the Pd-plated layer 72 appropriately roughened, and thus, it is possible to obtain a high fixing strength between the external electrode 40 and the conductive adhesive 240. For example, even when the thickness of the Pd-plated layer 72 is reduced, it is still possible to make the surface of the Pd-plated layer 72 a rough surface, a result of which it is possible to achieve both a cost reduction and high fixing strength.

(8) The Pd-plated layer 72 according to the present preferred embodiment covers the entire or substantially the entire surface of the lower plated layer.

Therefore, it is possible to prevent oxidation of the lower plated layer by exposure thereof, and an increase in electrical resistance accompanying this.

(9) The external electrodes 40 are each to be connected to the connection conductor of the mounting substrate 210 using the conductive adhesive 240.

As a result, in the multilayer ceramic capacitor 1 mounted using the conductive adhesive 240, it is possible to obtain a high fixing strength between the external electrode 40 and the conductive adhesive 240.

(10) The mounting structure of the multilayer ceramic capacitor 1 according to the present preferred embodiment includes the multilayer ceramic capacitor 1, the mounting substrate 210 including the connection conductor, and the conductive adhesive 240 which joins the external electrodes 40 of the multilayer ceramic capacitor 1 with the connection conductor of the mounting substrate 210.

As a result, it is possible to provide a mounting structure of the multilayer ceramic capacitor 1 capable of obtaining a high fixing strength between the external electrode 40 and the conductive adhesive 240.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a multilayer body including a plurality of stacked dielectric layers and a plurality of stacked internal electrode layers; and
    external electrodes each connected to the plurality of internal electrode layers; wherein
    the external electrodes each include a lower plated layer and a Pd-plated layer on the lower plated layer;
    a plurality of recesses are provided on a surface of the Pd-plated layer;
    the plurality of recesses include first recesses each having a circle equivalent diameter of an opening of about 0.5 µm or more and about 4 µm or less, and second recesses each having a circle equivalent diameter of an opening of about 10 µm or more and about 22 µm or less;
    the first recesses are greater in number than the second recesses; and
    the second recesses and the first recesses are in a mixed state.

2. The multilayer ceramic capacitor according to claim 1, wherein
    each of the external electrodes includes a foundation electrode layer; and
    the lower plated layer is on the foundation electrode layer.

3. The multilayer ceramic capacitor according to claim 1, wherein the lower plated layer is a Ni-plated layer.

4. The multilayer ceramic capacitor according to claim 1, wherein
    the first recesses are on the surface of the Pd-plated layer with an existence probability of about ten or more per 100 µm$^2$; and
    the second recesses are on the surface of the Pd-plated layer with an existence probability of about five or more per $1 \times 10^5$ µm$^2$.

5. The multilayer ceramic capacitor according to claim 1, wherein
    a thickness of the Pd-plated layer is less than about 1 µm; and
    a maximum height of the surface of the Pd-plated layer is about 2 µm or more.

6. The multilayer ceramic capacitor according to claim 1, wherein
    a thickness of the lower plated layer is about 2 µm or more; and
    a porosity of the lower plated layer at least in a region of about 1 µm on an upper layer side is about 5% or more and about 50% or less.

7. The multilayer ceramic capacitor according to claim 1, wherein
    the lower plated layer includes a dense region and a porous region in order from a side of the multilayer body; and
    a porosity of the dense region is about 1% or less, and a porosity of the porous region is about 5% or more and about 50% or less.

8. The multilayer ceramic capacitor according to claim 1, wherein the Pd-plated layer covers an entire or substantially an entire surface of the lower plated layer.

9. The multilayer ceramic capacitor according to claim 1, wherein each of the external electrodes are configured to be connected to a connection conductor of a mounting substrate with a conductive adhesive.

10. A mounting structure of a multilayer ceramic capacitor comprising:
    the multilayer ceramic capacitor according to claim 1;
    a mounting substrate including a connection conductor; and
    a conductive adhesive joining the external electrodes of the multilayer ceramic capacitor with the connection conductor of the mounting substrate.

11. The mounting structure of a multilayer ceramic capacitor according to claim 10, wherein
    each of the external electrodes includes a foundation electrode layer; and
    the lower plated layer is on the foundation electrode layer.

12. The mounting structure of a multilayer ceramic capacitor according to claim 10, wherein the lower plated layer is a Ni-plated layer.

13. The mounting structure of a multilayer ceramic capacitor according to claim 10, wherein
    the first recesses are on the surface of the Pd-plated layer with an existence probability of about ten or more per 100 µm$^2$; and
    the second recesses are on the surface of the Pd-plated layer with an existence probability of about five or more per $1 \times 10^5$ µm$^2$.

14. The mounting structure of a multilayer ceramic capacitor according to claim 10, wherein
    a thickness of the Pd-plated layer is less than about 1 µm; and a maximum height of the surface of the Pd-plated layer is about 2 μm or more.

15. The mounting structure of a multilayer ceramic capacitor according to claim 10, wherein
a thickness of the lower plated layer is about 2 μm or more; and
a porosity of the lower plated layer at least in a region of about 1 μm on an upper layer side is about 5% or more and about 50% or less.

16. The mounting structure of a multilayer ceramic capacitor according to claim 10, wherein
the lower plated layer includes a dense region and a porous region in order from a side of the multilayer body; and
a porosity of the dense region is about 1% or less, and a porosity of the porous region is about 5% or more and about 50% or less.

17. The mounting structure of a multilayer ceramic capacitor according to claim 10, wherein the Pd-plated layer covers an entire or substantially an entire surface of the lower plated layer.

* * * * *